United States Patent
Zhao et al.

(10) Patent No.: US 11,638,039 B2
(45) Date of Patent: *Apr. 25, 2023

(54) SIMPLIFICATION FOR CROSS-COMPONENT LINEAR MODEL PREDICTION MODE

(71) Applicant: TENCENT AMERICA LLC, Palo Alto, CA (US)

(72) Inventors: Liang Zhao, Sunnyvale, CA (US); Xin Zhao, San Diego, CA (US); Xiang Li, Los Gatos, CA (US); Shan Liu, San Jose, CA (US)

(73) Assignee: TENCENT AMERICA LLC, Palo Alto, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/373,019

(22) Filed: Jul. 12, 2021

(65) Prior Publication Data
US 2021/0344966 A1    Nov. 4, 2021

Related U.S. Application Data

(63) Continuation of application No. 16/523,258, filed on Jul. 26, 2019, now Pat. No. 11,095,921.
(Continued)

(51) Int. Cl.
*H04N 19/80* (2014.01)
*H04N 19/117* (2014.01)
(Continued)

(52) U.S. Cl.
CPC ........... *H04N 19/80* (2014.11); *H04N 19/105* (2014.11); *H04N 19/117* (2014.11);
(Continued)

(58) Field of Classification Search
CPC ............... H04N 19/176; H04N 19/117; H04N 19/593; H04N 19/105; H04N 19/11;
(Continued)

(56) References Cited

U.S. PATENT DOCUMENTS

| 2012/0230421 | A1 | 9/2012 | Chen et al. |
| 2016/0191946 | A1* | 6/2016 | Zhou ............... H04N 19/17 375/240.16 |

(Continued)

FOREIGN PATENT DOCUMENTS

| EP | 3013049 A1 | 4/2016 |
| JP | 2015-8341 A | 1/2015 |

(Continued)

OTHER PUBLICATIONS

International Search Report in International Application No. PCT/US2019/065627, dated Feb. 28, 2020.
(Continued)

*Primary Examiner* — Masum Billah
(74) *Attorney, Agent, or Firm* — Sughrue Mion, PLLC

(57) ABSTRACT

A method and apparatus for encoding or decoding a video sequence includes applying a Cross-Component Linear Model (CCLM) to a video sequence, and applying an interpolation filter in the Cross-Component Linear Model (CCLM), wherein the interpolation filter is dependent upon a YUV format of the video sequence.

20 Claims, 21 Drawing Sheets

Related U.S. Application Data

(60) Provisional application No. 62/789,992, filed on Jan. 8, 2019, provisional application No. 62/788,729, filed on Jan. 4, 2019, provisional application No. 62/785,678, filed on Dec. 27, 2018, provisional application No. 62/781,316, filed on Dec. 18, 2018.

(51) Int. Cl.
| | |
|---|---|
| *H04N 19/132* | (2014.01) |
| *H04N 19/176* | (2014.01) |
| *H04N 19/124* | (2014.01) |
| *H04N 19/186* | (2014.01) |
| *H04N 19/105* | (2014.01) |

(52) U.S. Cl.
CPC ......... *H04N 19/124* (2014.11); *H04N 19/132* (2014.11); *H04N 19/176* (2014.11); *H04N 19/186* (2014.11)

(58) Field of Classification Search
CPC ............... H04N 19/132; H04N 19/182; H04N 19/186; H04N 19/82; H04N 19/70; H04N 19/159; H04N 19/59; H04N 19/124; H04N 19/147; H04N 19/154; H04N 19/463; H04N 19/513
USPC ....................................................... 375/240
See application file for complete search history.

(56) References Cited

U.S. PATENT DOCUMENTS

| | | |
|---|---|---|
| 2018/0063527 A1 | 3/2018 | Chen et al. |
| 2018/0091825 A1* | 3/2018 | Zhao .................... H04N 19/117 |
| 2020/0260120 A1* | 8/2020 | Hanhart ................. H04N 19/86 |

FOREIGN PATENT DOCUMENTS

| | | |
|---|---|---|
| JP | 2018-174567 A | 11/2018 |
| WO | 2018/053293 A1 | 3/2018 |

OTHER PUBLICATIONS

Written Opinion in International Application No. PCT/US2019/065627, dated Feb. 28, 2020.

Communication dated May 30, 2022 from the Japanese Patent Office in Application No. 2021-528423.

\* cited by examiner

FIG. 3A
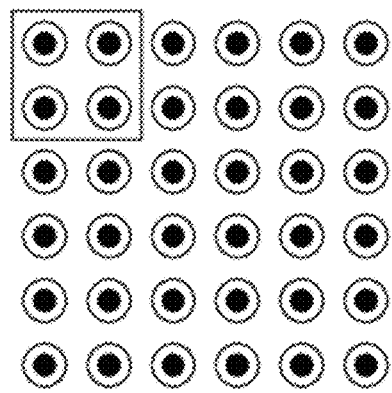
4:4:4
FIG. 3B
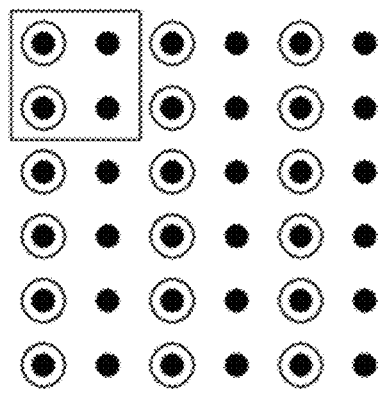
4:2:2
● Luminance
○ Chrominance
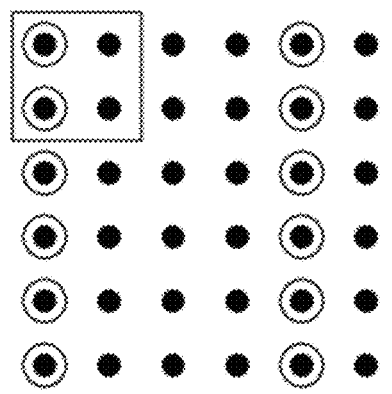
4:1:1
FIG. 3C
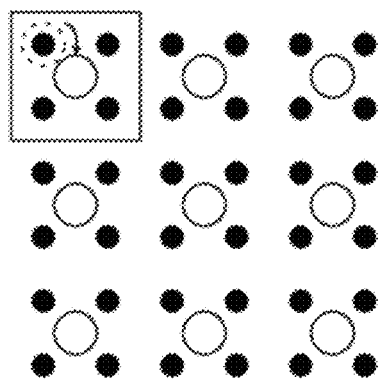
4:2:0
FIG. 3D

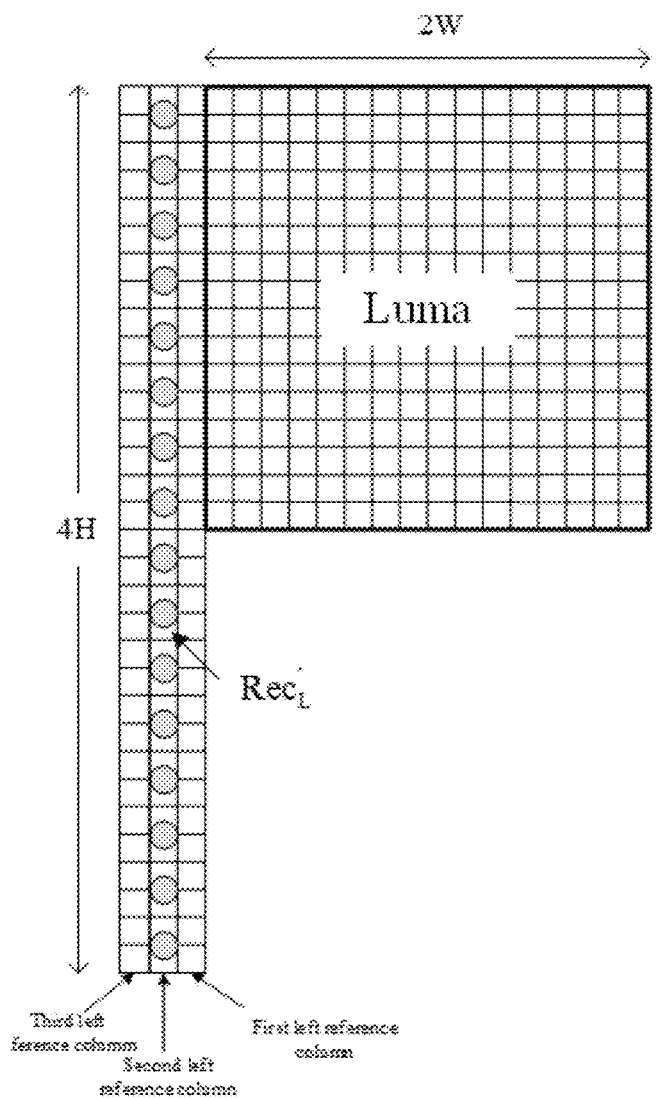
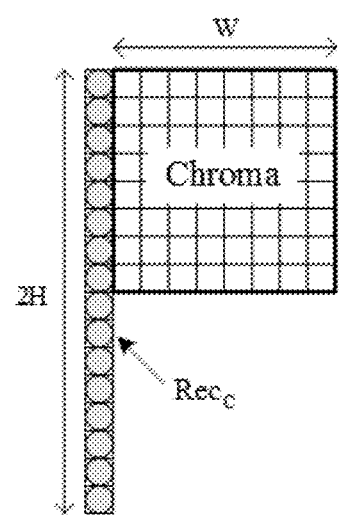
FIG. 7A
FIG. 7B

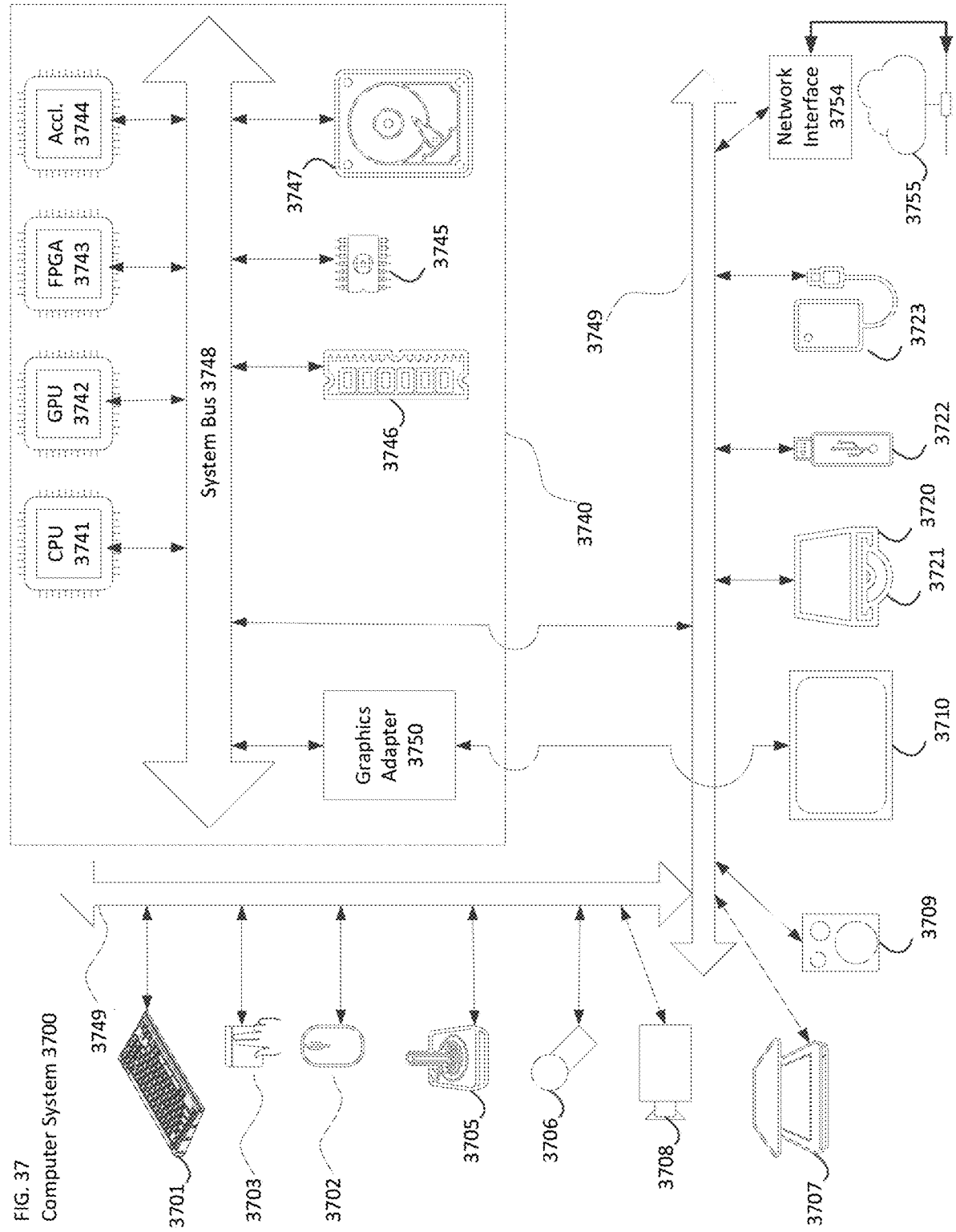

SIMPLIFICATION FOR CROSS-COMPONENT LINEAR MODEL PREDICTION MODE

CROSS-REFERENCE TO RELATED APPLICATION

This application is a continuation of U.S. application Ser. No. 16/523,258 filed on Jul. 26, 2019, which claims priority under 35 U.S.C. § 119 from U.S. Provisional Application No. 62/781,316 filed on Dec. 18, 2018, U.S. Provisional Application No. 62/785,678 filed on Dec. 27, 2018, U.S. Provisional Application No. 62/788,729 filed on Jan. 4, 2019, and U.S. Provisional Application No. 62/789,992 filed on Jan. 8, 2019, in the U.S. Patent & Trademark Office, the disclosures of which are incorporated herein by reference in their entireties.

FIELD

Methods and apparatuses consistent with embodiments relate to video processing, and more particularly, encoding or decoding a video sequence with a focus on simplifying Cross Component Linear Model prediction modes.

BACKGROUND

Recently, the Video Coding Experts Group (VCEG) of the ITU Telecommunication Standardization Sector (ITU-T), a sector of the International Telecommunication Union (ITU), and the ISO/IEC MPEG (JTC 1/SC 29/WG 11), a standardization subcommittee of the Joint Technical Committee ISO/IEC JTC 1 of the International Organization for Standardization (ISO) and the International Electrotechnical Commission (IEC), published the H.265/High Efficiency Video Coding (HEVC) standard in 2013 (version 1). This standard was updated in 2014 to version 2, in 2015 to version 3, and in 2016 to version 4.

In October 2017, they issued the Joint Call for Proposals on Video Compression with Capability beyond HEVC (CfP). By Feb. 15, 2018, 22 CfP responses on standard dynamic range (SDR), 12 CfP responses on high dynamic range (HDR), and 12 CfP responses on 360 video categories were submitted, respectively. In April 2018, all received CfP responses were evaluated in the 122 MPEG/10th JVET meeting. As a result of this meeting, JVET formally launched the standardization process of next-generation video coding beyond HEVC. The new standard was named Versatile Video Coding (VVC), and JVET was renamed as Joint Video Expert Team.

Intra-prediction modes for luma components in HEVC will now be described. The intra-prediction modes used in HEVC are illustrated in FIG. 1. In HEVC, there may be a total of 35 intra-prediction modes, among which mode 10 may be horizontal mode, mode 26 may be vertical mode, and modes 2, 18 and 34 may be diagonal modes. The intra-prediction modes may be signaled by three most probable modes (MPMs) and 32 remaining modes.

Intra-prediction modes for luma components in VVC will now be described. In the current development of VVC, there may be a total 95 intra-prediction modes as shown in FIG. 2, where mode 18 may be horizontal mode, mode 50 may be a vertical mode, and modes 2, 34 and 66 may be diagonal modes. Modes −1~−14 and Modes 67~80 may be called Wide-Angle Intra-Prediction (WAIP) modes. As shown in FIG. 2, 35 intra-prediction modes may be used in HEVC.

Intra-prediction mods for luma components in VVC will now be described. In the current development of VVC, there may be a total 95 intra-prediction modes as shown in FIG. 2, where mode 18 may be a horizontal mode, mode 50 may be a vertical mode, and modes 2, 34 and 66 may be diagonal modes. Modes −1~−14 and Modes 67~80 may be called Wide-Angle Intra-Prediction (WAIP) modes.

Intra-mode modes for chroma components in VVC will now be described. In VTM, for the chroma components of an intra-PU, an encoder may select the best chroma prediction mode among 8 modes including Planar, DC, Horizontal, Vertical, a direct copy of the intra-prediction mode (DM) from the luma component, Left and Top Cross-component Linear Mode (LT_CCLM), Left Cross-component Linear Mode (L_CCLM), and Top Cross-component Linear Mode (T_CCLM). LT_CCLM, L_CCLM, and T_CCLM may be categorized into the group of Cross-component Linear Mode (CCLM). A difference between these 3 modes is that different regions of neighboring samples may be used for deriving the parameters α and β. For LT_CCLM, both the left and top neighboring samples may be used to derive the parameters α and β. For L_CCLM, generally only the left neighboring samples may be used to derive the parameters α and β. For T_CCLM, generally only the top neighboring samples may be used to derive the parameters α and β.

Cross-Component Linear Model (CCLM) prediction modes may be used to reduce the cross-component redundancy, in which chroma samples may be predicted based on the reconstructed luma samples of the same CU by using a linear model as follows:

$$\text{pred}_C(i,j) = \alpha \cdot \text{rec}_L{'}(i,j) + \beta$$

where $\text{pred}_C(i,j)$ represents the predicted chroma samples in a CU and $\text{rec}_L(i,j)$ represents the downsampled reconstructed luma samples of the same CU. Parameters α and β may be derived by a straight-line equation, also called a max-min method. This computation process may be performed as part of the decoding process, not just as an encoder search operation, so no syntax is necessarily used to convey the α and β values.

There are different YUV formats, which is shown in FIGS. 3A-3D. With the 4:2:0 format, LM prediction may apply a six-tap interpolation filter to get the down-sampled luma sample corresponding to a chroma sample as shown in FIGS. 3A-3D. In a formulaic way, a down-sampled luma sample Rec'L[x, y] may be calculated from reconstructed luma samples as:

$$\text{Rec}'_L[x,y] = (2 \times \text{Rec}_L[2x,2y] + 2 \times \text{Rec}_L[2x,2y+1] +$$

$$\text{Rec}_L[2x-1,2y] + \text{Rec}_L[2x+1,2y] +$$

$$\text{Rec}_L[2x-1,2y+1] + \text{Rec}_L[2x+1,2y+1] + 4) >> 3$$

The down-sampled luma samples may be used to find the maximum and minimum sample points. The 2 points (couple of Luma and Chroma) (A, B) may be the minimum and maximum values inside the set of neighboring Luma samples as depicted in FIG. 4.

Where the linear model parameters α and β may be obtained according to the following equation:

$$\alpha = \frac{y_B - y_A}{x_B - x_A}$$

$$\beta = y_A - \alpha x_A$$

Here, division may be avoided and replaced by a multiplication and a shift. One Look-up Table (LUT) may be used to store the pre-calculated values, and the absolute difference values between maximum and minimum luma samples may be used to specify the entry index of the LUT, and the size of the LUT may be 512.

It was also proposed that, the absolute difference between maximum and minimum luma sample values within the specified neighboring sample regions, denoted by diff_Y, may be non-uniform quantized, and the quantized value of the absolute difference may be used to specify the entry index of the CCLM Look-up Table (LUT) such that the size of LUT is reduced. The range of diff_Y is divided into multiple intervals, and different quantization step sizes may be used in different intervals. In one example, the range of diff_Y may be divided into two intervals, if diff_Y is lower than or equal to a threshold, named as Thres_1, one step size is used, named as Step_A. Otherwise, another step size may be used, named as Step_B. Consequently, the parameter a in CCLM may be obtained as follows:

$$a = (\text{diff}_Y > \text{Thres\_1}) ? LUT\left[\frac{\text{Thres\_1}}{\text{Step\_A}} + \frac{\text{diff\_Y} - \text{Thres\_1}}{\text{Step\_B}} - 1\right];$$

$$LUT[\text{diff\_Y}/\text{Step\_A} - 1]$$

Here, Thres_1, Step_A, and Step_B can be any positive integer, such as 1, 2, 3, 4, and so on. Also, Step_A and Step_B are not equal.

To derive the Chroma predictor, as for the current VTM implementation, the multiplication is replaced by an integer operation as the following, where maxY, minY, maxC, and minC denotes the maximum luma sample value, minimum luma sample value, maximum chroma sample value, and minimum chroma sample value respectively. numSampL and numSampT denote the number of available left and top neighboring samples respectively. The following texts are from VVC draft 3 clause 8.2.4.2.8.

The variables a, b, and k are derived as follows:
If numSampL is equal to 0, and numSampT is equal 0, the following applies:
k=0
a=0
b=1>>(BitDepthC−1)
Otherwise, the following applies:
shift=(BitDepthC>8) ? BitDepthC−9:0
add=shift ? 1<<(shift−1):0
diff=(maxY−minY+add)>>shift
k=16
If diff is greater than 0, the following applies:
div=((maxC−minC)*(Floor($2^{32}$/diff)−Floor($2^{16}$/diff)*$2^{16}$)*$2^{15}$)>>16
a=((maxC−minC)*Floor($2^{16}$/diff)+div+add)>>shift
Otherwise, the following applies:
a=0
b=minC−((a*minY)>>k)
Equation for if diff is greater than 0, can also be simplified as follows:

$$a=((maxC-minC)*\text{Floor}(2^{16}/\text{diff})+add)>>shift$$

After deriving parameters a and b, the chroma predictor is calculated as follow:

$$\text{pred}_C(i,j)=(a \cdot \text{rec}_L'(i,j))>>S+b$$

Since the range of variable "diff" is from 1~512, the value of Floor($2^{16}$/diff) can be pre-calculated and stored in a look-up table (LUT) with size equal to 512. In addition, the value of diff is used to specify the entry index of the look-up table.

This computation process is performed as part of the decoding process, not just as an encoder search operation, so no syntax is used to convey the α and β values.

In a T_CCLM mode, only the above neighboring samples (including 2*W samples) are used to calculate the linear model coefficients. In L_CCLM mode, only left neighboring samples (including 2*H samples) are used to calculate the linear model coefficients. This is illustrated in FIGS. 6A-7B.

The CCLM prediction mode also includes prediction between the two chroma components, i.e., the Cr component may be predicted from the Cb component. Instead of using the reconstructed sample signal, the CCLM Cb-to-Cr prediction may be applied in residual domain. This may be implemented by adding a weighted reconstructed Cb residual to the original Cr intra-prediction to form the final Cr prediction:

$$\text{pred}_{Cr}^*(i,j)=\text{pred}_{Cr}(i,j)+\alpha \cdot \text{resi}_{Cb}'(i,j)$$

The CCLM luma-to-chroma prediction mode may be added as one additional chroma intra-prediction mode. At the encoder side, one more RD cost check for the chroma components may be added for selecting the chroma intra-prediction mode. When intra-prediction modes other than the CCLM luma-to-chroma prediction mode is used for the chroma components of a CU, CCLM Cb-to-Cr prediction may be used for Cr component prediction.

Multiple Model CCLM (MMLM) is another extension of CCLM. As indicated by the name, there may be more than one model in MMLM, such as two models. In MMLM, neighboring luma samples and neighboring chroma samples of the current block may be classified into two groups, each group may be used as a training set to derive a linear model (i.e., a particular α and β are derived for a particular group). Furthermore, the samples of the current luma block may also be classified based on the same rule for the classification of neighboring luma samples.

FIG. 8 shows an example of classifying the neighboring samples into two groups. Here, a threshold may be calculated as the average value of the neighboring reconstructed luma samples. A neighboring sample with Rec'L[x,y] <=Threshold may be classified into group 1; while a neighboring sample with Rec'L[x,y]>Threshold may be classified into group 2

$$\begin{cases} Pred_C[x,y] = \alpha_1 \times Rec'_L[x,y] + \beta_1 & \text{if } Rec'_L[x,y] \leq \text{Threshold} \\ Pred_C[x,y] = \alpha_2 \times Rec'_L[x,y] + \beta_2 & \text{if } Rec'_L[x,y] > \text{Threshold} \end{cases}$$

Local Illumination Compensation (LIC) is based on a linear model for illumination changes, using a scaling factor a and an offset b. It is enabled or disabled adaptively for each inter-mode coded coding unit (CU).

When applying LIC for a CU, a least square error method is employed to derive the parameters a and b by using neighboring samples of the current CU and their corresponding reference samples. More specifically, as illustrated in FIGS. 14A and 14B, subsampled (2:1 subsampling) neighboring samples of a current CU 1410 (as shown in portion FIG. A) and the corresponding samples (identified by motion information of the current CU or sub-CU) in a reference picture or block 1420 (as shown in FIG. 14B) are used. IC parameters are derived and applied for each prediction direction separately.

When a CU is coded with merge mode, an LIC flag is copied from neighboring blocks, in a way similar to motion information copy in merge mode; otherwise, an LIC flag is signaled for the CU to indicate whether LIC applies or not.

Despite the above-described advances, there exist issues with the state of the art. Currently in VTM3.0, with the 4:2:0 YUV format, a 6-tap interpolation filter may be applied to all the luma samples in a specified neighboring region, but eventually only the two luma samples with maximum and minimum values are used for deriving the CCLM parameters, which increases the decoder complexity without clear benefits in coding efficiency. Further, in VTM3.0, the interpolation filter for the luma samples in CCLM only supports 4:2:0 YUV format, however, 4:4:4 and 4:2:2 YUV format is still popular and need to be supported.

Currently in VTM3.0, a size of a look-up table (LUT) for CCLM is 512, i.e., the look-up table has 512 elements and each element is represented by a 16-bit integer, which increases too much decoder memory cost without clear benefits in coding efficiency. Further, although concepts of CCLM and LIC are similar, they use different methods to derive parameters a and b for a linear model, which is not desirable.

Currently in VTM3.0, for large blocks, such as 32×32 chroma blocks, 64 samples in a specified neighboring region are used to calculate maximum and minimum values, which increases decoder complexity without clear benefits in coding efficiency.

Currently in VTM3.0, for large blocks, such as 64×64 blocks, 64 samples in a specified neighboring region are used to calculate linear model parameters a and b, which increases decoder complexity without clear benefits in coding efficiency.

SUMMARY

According to an aspect of the disclosure a method for encoding or decoding a video sequence may comprise: applying a Cross-Component Linear Model (CCLM) to a video sequence, and applying an interpolation filter in the Cross-Component Linear Model (CCLM), wherein the interpolation filter may be dependent upon a YUV format of the video sequence.

According to an aspect of the disclosure, in a method described above, wherein in applying the interpolation filter in the Cross-Component Linear Model (CCLM), the method further comprises using taps of the interpolation filter that are dependent upon the YUV format of the video sequence.

According to this aspect of the disclosure, the method may further comprise using taps of the interpolation filter used in the Cross-Component Linear Model (CCLM) that are in the same form as the YUV format of the video sequence.

According to an aspect of the disclosure, in a method described above, wherein in applying the interpolation filter in the Cross-Component Linear Model (CCLM), the method may further comprise setting the format of the interpolation filter to be the same for the format of the video sequence when the video sequence includes a YUV format of 4:4:4: or 4:2:2, and may comprise setting the format of the interpolation filter to be different than the format of the video sequence when the video sequence includes a YUV format of 4:2:0.

According to an aspect of the disclosure, in a method described above, wherein in applying the interpolation filter in the Cross-Component Linear Model (CCLM), the method may further comprise using taps of the interpolation filter which are different for different YUV formats of the video sequence.

According to an aspect of the disclosure, in a method described above, wherein in in applying the interpolation filter in the Cross-Component Linear Model (CCLM), the method may further comprise setting the interpolation filter to be different for top and left neighboring luma reconstructed samples.

According to this aspect of the disclosure, the method may further comprise setting the interpolation filter, which is applied to the top and left neighboring luma reconstructed samples to be dependent on the YUV format of the video sequence.

According to an aspect of the disclosure, a method may further comprise setting a number of lines in top neighboring luma samples and a number of columns in left neighboring luma samples used in the Cross-Component Linear Model (CCLM) to be dependent on the YUV format of the video sequence.

According to this aspect of the disclosure, a method may further comprise using one row in a top neighboring region or/and one column in a left neighboring region in the Cross-Component Linear Model (CCLM) for video sequences having one of a YUV format of 4:4:4 or 4:2:2.

According to this aspect of the disclosure, a method may further comprise using one row in a top neighboring region and/or at least two columns in a left neighboring region in the Cross-Component Linear Model (CCLM) for video sequences having a YUV format of 4:2:2.

According to an aspect of the disclosure, a device for encoding or decoding a video sequence, may comprise: at least one memory configured to store program code; at least one processor configured to read the program code and operate as instructed by the program code, wherein the program code may include: first encoding or decoding code configured to cause the at least one processor to apply a Cross-Component Linear Model (CCLM) to a video sequence and apply an interpolation filter in the Cross-Component Linear Model (CCLM), wherein the interpolation filter may be dependent upon a YUV format of the video sequence.

According to an aspect of the disclosure, the first encoding or decoding code may further comprise code configured to cause the at least one processor to: use taps of the interpolation filter applied, in the Cross-Component Linear Model (CCLM), that are dependent upon the YUV format of the video sequence.

According to this aspect of the disclosure, the first encoding or decoding code may further comprise code configured to cause the at least one processor to: use taps of the interpolation filter applied, in the Cross-Component Linear Model (CCLM), that are in the same form as the YUV format of the video sequence.

According to an aspect of the disclosure, the first encoding or decoding code may further comprise code configured to cause the at least one processor to: set the format of the interpolation filter, applied in the Cross-Component Linear Model (CCLM), to be the same for the format of the video sequence when the video sequence includes a YUV format of 4:4:4: or 4:2:2, and set the format of the interpolation filter to be different than the format of the video sequence when the video sequence includes a YUV format of 4:2:0.

According to an aspect of the disclosure, the first encoding or decoding code may further comprise code configured to cause the at least one processor to: use taps of the interpolation filter, applied in the Cross-Component Linear Model (CCLM), which are different for different YUV formats of the video sequence.

According to an aspect of the disclosure, the first encoding or decoding code may further comprise code configured to cause the at least one processor to: set the interpolation filter, applied in the Cross-Component Linear Model (CCLM), to be different for top and left neighboring luma reconstructed samples.

According to this aspect of the disclosure, the first encoding or decoding code may further comprise code configured to cause the at least one processor to: set the interpolation filter, which is applied to the top and left neighboring luma reconstructed samples, to be dependent on the YUV format of the video sequence.

According to an aspect of the disclosure, the first encoding or decoding code may further comprise code configured to cause the at least one processor to: set a number of lines in top neighboring luma samples and a number of columns in left neighboring luma samples used in the Cross-Component Linear Model (CCLM) to be dependent on the YUV format of the video sequence.

According to this aspect of the disclosure, the first encoding or decoding code may further comprise code configured to cause the at least one processor to: use one row in a top neighboring region or/and at least one column in a left neighboring region in the Cross-Component Linear Model (CCLM) for video sequences having one of a YUV format of 4:4:4 or 4:2:2.

According to an aspect of the disclosure, a non-transitory computer-readable medium storing program code may be provided, the program code comprising one or more instructions that, when executed by one or more processors of a device, may cause the one or more processors to: apply a Cross-Component Linear Model (CCLM) to a video sequence and apply an interpolation filter in the Cross-Component Linear Model (CCLM), wherein the interpolation filter is dependent upon a YUV format of the video sequence.

While the afore described methods, devices, and non-transitory computer-readable mediums have been described individually, these descriptions are not intended to suggest any limitation as to the scope of use or functionality thereof. Indeed these methods, devices, and non-transitory computer-readable mediums may be combined in other aspects of the disclosure.

BRIEF DESCRIPTION OF THE DRAWINGS

Further features, the nature, and various advantages of the disclosed subject matter will be more apparent from the following detailed description and the accompanying drawings in which:

FIG. 3A is a diagram a YUV format in accordance with an embodiment;

FIG. 3B is a diagram a YUV format in accordance with an embodiment;

FIG. 3C is a diagram a YUV format in accordance with an embodiment;

FIG. 3D is a diagram a YUV format in accordance with an embodiment;

FIG. 7A is a diagram of samples used in cross-component linear modeling in accordance with an embodiment;

FIG. 7B is a diagram of samples used in cross-component linear modeling in accordance with an embodiment;

FIGS. 27 and 28 are diagrams of positions of filters for luma samples, according to embodiments;

FIG. 37 is a diagram of a computer system in accordance with an embodiment.

DETAILED DESCRIPTION

Figure 9:
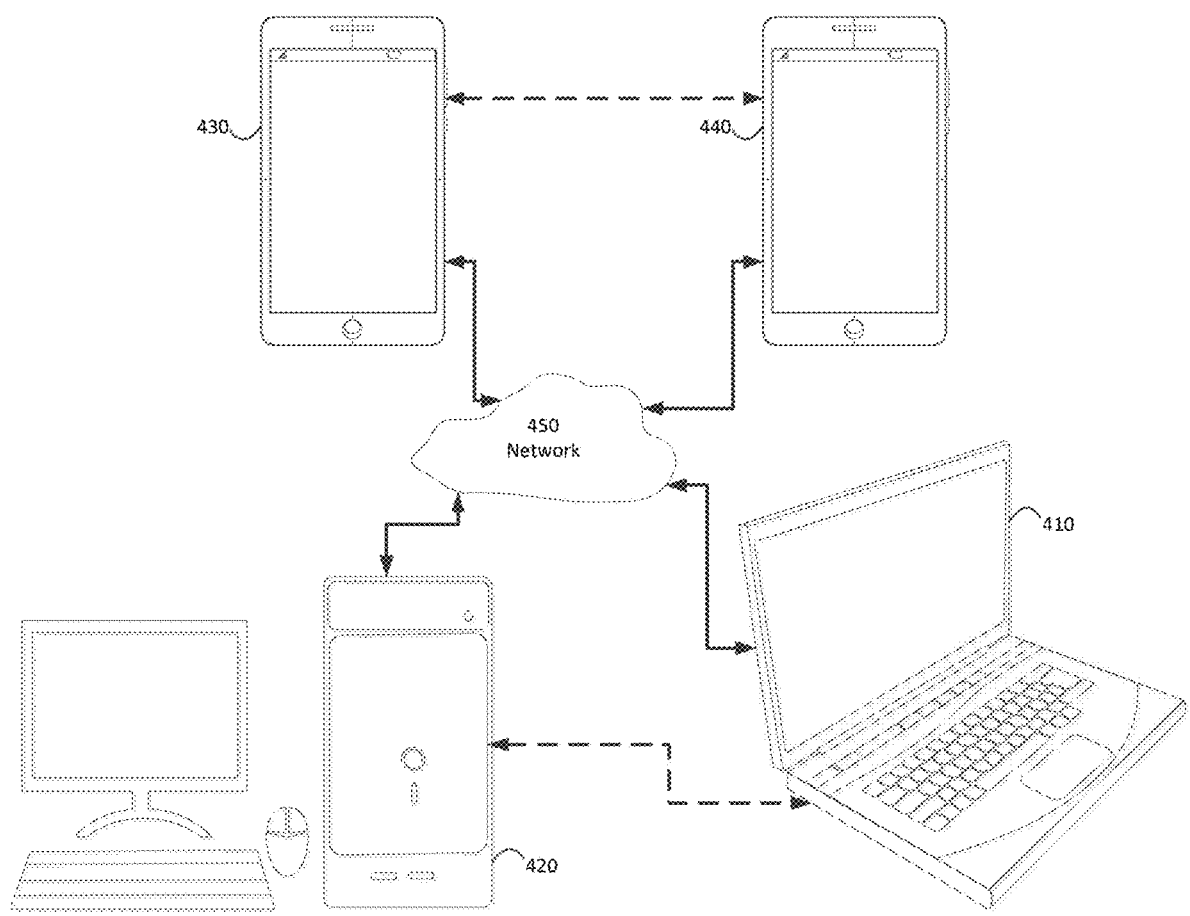
FIG. 9 is a simplified block diagram of a communication system in accordance with an embodiment.

FIG. 9 illustrates a simplified block diagram of a communication system (400) according to an embodiment of the present disclosure. The communication system (400) may include at least two terminals (410-420) interconnected via a network (450). For unidirectional transmission of data, a first terminal (410) may code video data at a local location for transmission to the other terminal (420) via the network (450). The second terminal (420) may receive the coded video data of the other terminal from the network (450), decode the coded data and display the recovered video data. Unidirectional data transmission may be common in media serving applications and the like.

FIG. 9 illustrates a second pair of terminals (430, 440) provided to support bidirectional transmission of coded video that may occur, for example, during videoconferencing. For bidirectional transmission of data, each terminal (430, 440) may code video data captured at a local location for transmission to the other terminal via the network (450). Each terminal (430, 440) also may receive the coded video data transmitted by the other terminal, may decode the coded data and may display the recovered video data at a local display device.

In FIG. 9, the terminals (410-440) may be illustrated as servers, personal computers and smart phones but the principles of the present disclosure are not so limited. Embodiments of the present disclosure find application with laptop computers, tablet computers, media players and/or dedicated video conferencing equipment. The network (450) represents any number of networks that convey coded video data among the terminals (410-440), including for example wireline and/or wireless communication networks. The communication network (450) may exchange data in circuit-switched and/or packet-switched channels. Representative networks include telecommunications networks, local area networks, wide area networks and/or the Internet. For the purposes of the present discussion, the architecture and topology of the network (450) may be immaterial to the operation of the present disclosure unless explained herein below.

Figure 10:
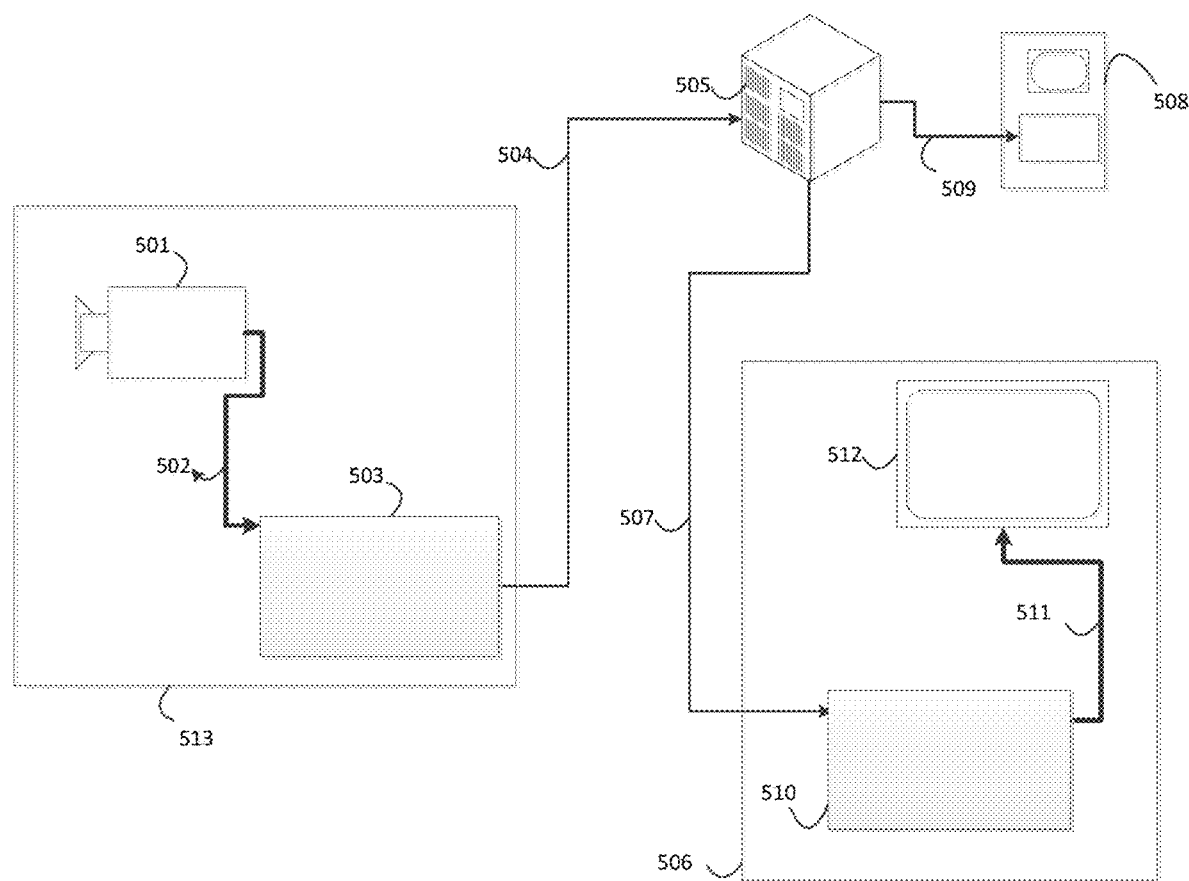
FIG. 10 is a diagram of a streaming environment in accordance with an embodiment.

FIG. 10 illustrates, as an example for an application for the disclosed subject matter, the placement of a video encoder and decoder in a streaming environment. The disclosed subject matter can be equally applicable to other video enabled applications, including, for example, video conferencing, digital TV, storing of compressed video on digital media including CD, DVD, memory stick and the like, and so on.

A streaming system may include a capture subsystem (513), that can include a video source (501), for example a digital camera, creating, for example, an uncompressed video sample stream (502). That sample stream (502), depicted as a bold line to emphasize a high data volume when compared to encoded video bitstreams, can be processed by an encoder (503) coupled to the camera (501). The encoder (503) can include hardware, software, or a combination thereof to enable or implement aspects of the disclosed subject matter as described in more detail below. The encoded video bitstream (504), depicted as a thin line to emphasize the lower data volume when compared to the sample stream, can be stored on a streaming server (505) for future use. One or more streaming clients (506, 508) can access the streaming server (505) to retrieve copies (507, 509) of the encoded video bitstream (504). A client (506) can include a video decoder (510) which decodes the incoming copy of the encoded video bitstream (507) and creates an outgoing video sample stream (511) that can be rendered on a display (512) or other rendering device (not depicted). In some streaming systems, the video bitstreams (504, 507, 509) can be encoded according to certain video coding/compression standards. Examples of those standards include H.265 HEVC. Under development is a video coding standard informally known as Versatile Video Coding (VVC). The disclosed subject matter may be used in the context of VVC.

Figure 11:
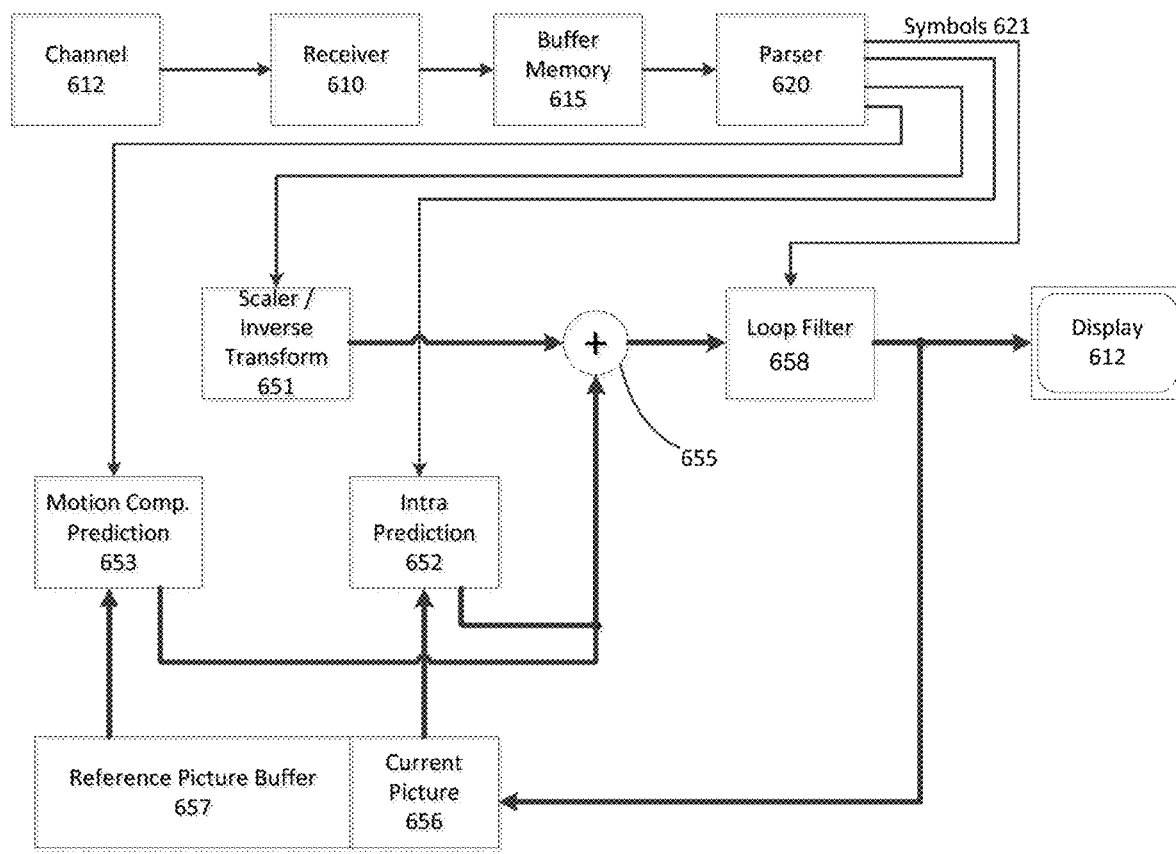
FIG. 11 is a block diagram of a video decoder in accordance with an embodiment.

FIG. 11 may be a functional block diagram of a video decoder (510) according to an embodiment of the present invention.

A receiver (610) may receive one or more codec video sequences to be decoded by the decoder (610); in the same or another embodiment, one coded video sequence at a time, where the decoding of each coded video sequence is independent from other coded video sequences. The coded video sequence may be received from a channel (612), which may be a hardware/software link to a storage device which stores the encoded video data. The receiver (610) may receive the encoded video data with other data, for example, coded audio data and/or ancillary data streams, that may be forwarded to their respective using entities (not depicted). The receiver (610) may separate the coded video sequence from the other data. To combat network jitter, a buffer memory (615) may be coupled in between receiver (610) and entropy decoder/parser (620) ("parser" henceforth). When receiver (610) is receiving data from a store/forward device of sufficient bandwidth and controllability, or from an isosychronous network, the buffer (615) may not be needed, or can be small. For use on best effort packet networks such as the Internet, the buffer (615) may be required, can be comparatively large and can advantageously of adaptive size.

The video decoder (510) may include a parser (620) to reconstruct symbols (621) from the entropy coded video sequence. Categories of those symbols include information used to manage operation of the decoder (510), and potentially information to control a rendering device such as a display (512) that is not an integral part of the decoder but can be coupled to it, as was shown in FIG. 11. The control information for the rendering device(s) may be in the form of Supplementary Enhancement Information (SEI messages) or Video Usability Information (VUI) parameter set fragments (not depicted). The parser (620) may parse/entropy-decode the coded video sequence received. The coding of the coded video sequence can be in accordance with a video coding technology or standard, and can follow principles well known to a person skilled in the art, including variable length coding, Huffman coding, arithmetic coding with or without context sensitivity, and so forth. The parser (620) may extract from the coded video sequence, a set of subgroup parameters for at least one of the subgroups of pixels in the video decoder, based upon at least one parameters corresponding to the group. Subgroups can include Groups of Pictures (GOPs), pictures, tiles, slices, macroblocks, Coding Units (CUs), blocks, Transform Units (TUs), Prediction Units (PUs) and so forth. The entropy decoder/parser may also extract from the coded video sequence information such as transform coefficients, quantizer parameter (QP) values, motion vectors, and so forth.

The parser (620) may perform entropy decoding/parsing operation on the video sequence received from the buffer (615), so to create symbols (621). The parser (620) may receive encoded data, and selectively decode particular symbols (621). Further, the parser (620) may determine whether the particular symbols (621) are to be provided to a Motion Compensation Prediction unit (653), a scaler/inverse transform unit (651), an Intra-Prediction unit (652), or a loop filter unit (658).

Reconstruction of the symbols (621) can involve multiple different units depending on the type of the coded video picture or parts thereof (such as: inter and intra-picture, inter and intra-block), and other factors. Which units are involved, and how, can be controlled by the subgroup control information that was parsed from the coded video sequence by the parser (620). The flow of such subgroup control information between the parser (620) and the multiple units below is not depicted for clarity.

Beyond the functional blocks already mentioned, decoder (510) can be conceptually subdivided into a number of functional units as described below. In a practical implementation operating under commercial constraints, many of these units interact closely with each other and can, at least partly, be integrated into each other. However, for the purpose of describing the disclosed subject matter, the conceptual subdivision into the functional units below is appropriate.

A first unit is the scaler/inverse transform unit (651). The scaler/inverse transform unit (651) receives quantized transform coefficient as well as control information, including which transform to use, block size, quantization factor, quantization scaling matrices, etc. as symbol(s) (621) from the parser (620). It can output blocks comprising sample values, that can be input into aggregator (655).

In some cases, the output samples of the scaler/inverse transform (651) can pertain to an intra-coded block; that is: a block that is not using predictive information from previously reconstructed pictures, but can use predictive information from previously reconstructed parts of the current picture. Such predictive information can be provided by an intra-picture prediction unit (652). In some cases, the intra-picture prediction unit (652) generates a block of the same size and shape of the block under reconstruction, using surrounding already reconstructed information fetched from the current (partly reconstructed) picture (656). The aggregator (655), in some cases, adds, on a per sample basis, the prediction information the intra-prediction unit (652) has generated to the output sample information as provided by the scaler/inverse transform unit (651).

In other cases, the output samples of the scaler/inverse transform unit (651) can pertain to an inter coded, and potentially motion compensated block. In such a case, a Motion Compensation Prediction unit (653) can access reference picture memory (657) to fetch samples used for prediction. After motion compensating the fetched samples in accordance with the symbols (621) pertaining to the block, these samples can be added by the aggregator (655) to the output of the scaler/inverse transform unit (in this case called the residual samples or residual signal) so to generate output sample information. The addresses within the reference picture memory form where the motion compensation unit fetches prediction samples can be controlled by motion vectors, available to the motion compensation unit in the form of symbols (621) that can have, for example X, Y, and reference picture components. Motion compensation also can include interpolation of sample values as fetched from the reference picture memory when sub-sample exact motion vectors are in use, motion vector prediction mechanisms, and so forth.

The output samples of the aggregator (655) can be subject to various loop filtering techniques in the loop filter unit (658). Video compression technologies can include in-loop filter technologies that are controlled by parameters included in the coded video bitstream and made available to the loop filter unit (658) as symbols (621) from the parser (620), but can also be responsive to meta-information obtained during the decoding of previous (in decoding order) parts of the coded picture or coded video sequence, as well as responsive to previously reconstructed and loop-filtered sample values.

The output of the loop filter unit (658) can be a sample stream that can be output to the render device (512) as well as stored in the reference picture memory (656) for use in future inter-picture prediction.

Certain coded pictures, once fully reconstructed, can be used as reference pictures for future prediction. Once a coded picture is fully reconstructed and the coded picture has been identified as a reference picture (by, for example, parser (620)), the current reference picture (656) can become part of the reference picture buffer (657), and a fresh current picture memory can be reallocated before commencing the reconstruction of the following coded picture.

The video decoder (510) may perform decoding operations according to a predetermined video compression technology that may be documented in a standard, such as H.265 HEVC. The coded video sequence may conform to a syntax specified by the video compression technology or standard being used, in the sense that it adheres to the syntax of the video compression technology or standard, as specified in the video compression technology document or standard and specifically in the profiles document therein. Also necessary for compliance can be that the complexity of the coded video sequence is within bounds as defined by the level of the video compression technology or standard. In some cases, levels restrict the maximum picture size, maximum frame rate, maximum reconstruction sample rate (measured in, for example megasamples per second), maximum reference picture size, and so on. Limits set by levels can, in some cases, be further restricted through Hypothetical Reference Decoder (HRD) specifications and metadata for HRD buffer management signaled in the coded video sequence.

In an embodiment, the receiver (610) may receive additional (redundant) data with the encoded video. The additional data may be included as part of the coded video sequence(s). The additional data may be used by the video decoder (510) to properly decode the data and/or to more accurately reconstruct the original video data. Additional data can be in the form of, for example, temporal, spatial, or signal-to-noise ratio (SNR) enhancement layers, redundant slices, redundant pictures, forward error correction codes, and so on.

Figure 12:
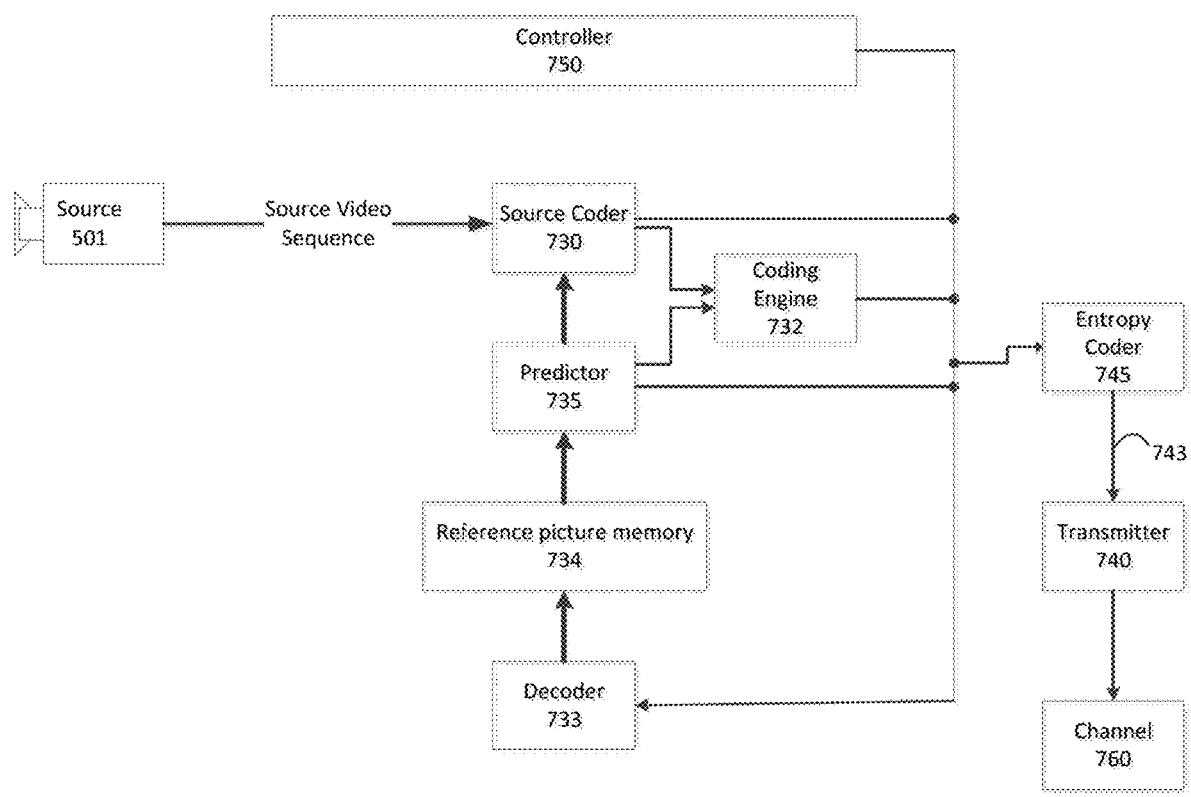
FIG. 12 is a block diagram of a video encoder in accordance with an embodiment.

FIG. 12 may be a functional block diagram of a video encoder (503) according to an embodiment of the present disclosure.

The encoder (503) may receive video samples from a video source (501) (that is not part of the encoder) that may capture video image(s) to be coded by the encoder (503).

The video source (501) may provide the source video sequence to be coded by the encoder (503) in the form of a digital video sample stream that can be of any suitable bit depth (for example: 8 bit, 10 bit, 12 bit, . . . ), any colorspace (for example, BT.601 Y CrCB, RGB, . . . ) and any suitable sampling structure (for example Y CrCb 4:2:0, Y CrCb 4:4:4). In a media serving system, the video source (501) may be a storage device storing previously prepared video. In a videoconferencing system, the video source (503) may be a camera that captures local image information as a video sequence. Video data may be provided as a plurality of individual pictures that impart motion when viewed in sequence. The pictures themselves may be organized as a spatial array of pixels, wherein each pixel can comprise one or more samples depending on the sampling structure, color space, etc. in use. A person skilled in the art can readily understand the relationship between pixels and samples. The description below focuses on samples.

According to an embodiment, the encoder (503) may code and compress the pictures of the source video sequence into a coded video sequence (743) in real time or under any other time constraints as required by the application. Enforcing appropriate coding speed is one function of Controller (750). Controller (750) controls other functional units as described below and is functionally coupled to these units. The coupling is not depicted for clarity. Parameters set by controller can include rate control related parameters (picture skip, quantizer, lambda value of rate-distortion optimization techniques, etc.), picture size, group of pictures (GOP) layout, maximum motion vector search range, and so forth. A person skilled in the art can readily identify other functions of controller (750) as they may pertain to video encoder (503) optimized for a certain system design.

Some video encoders operate in what a person skilled in the art readily recognizes as a "coding loop." As an over-simplified description, a coding loop can consist of the encoding part of an encoder (730) ("source coder" henceforth) (responsible for creating symbols based on an input picture to be coded, and a reference picture(s)), and a (local) decoder (733) embedded in the encoder (503) that reconstructs the symbols to create the sample data that a (remote) decoder also would create (as any compression between symbols and coded video bit stream is lossless in the video compression technologies considered in the disclosed subject matter). That reconstructed sample stream is input to the reference picture memory (734). As the decoding of a symbol stream leads to bit-exact results independent of decoder location (local or remote), the reference picture buffer content is also bit exact between local encoder and remote encoder. In other words, the prediction part of an encoder "sees" as reference picture samples exactly the same sample values as a decoder would "see" when using prediction during decoding. This fundamental principle of reference picture synchronicity (and resulting drift, if synchronicity cannot be maintained, for example because of channel errors) is well known to a person skilled in the art.

The operation of the "local" decoder (733) can be the same as of a "remote" decoder (510), which has already been described in detail above in conjunction with FIG. 10. Briefly referring also to FIG. 10, however, as symbols are available and en/decoding of symbols to a coded video sequence by entropy coder (745) and parser (620) can be lossless, the entropy decoding parts of decoder (510), including channel (612), receiver (610), buffer (615), and parser (620) may not be fully implemented in local decoder (733).

An observation that can be made at this point is that any decoder technology except the parsing/entropy decoding that is present in a decoder also necessarily needs to be present, in substantially identical functional form, in a corresponding encoder. The description of encoder technologies can be abbreviated as they are the inverse of the comprehensively described decoder technologies. Only in certain areas a more detail description is required and provided below.

As part of its operation, the source coder (730) may perform motion compensated predictive coding, which codes an input frame predictively with reference to one or more previously-coded frames from the video sequence that were designated as "reference frames." In this manner, the coding engine (732) codes differences between pixel blocks of an input frame and pixel blocks of reference frame(s) that may be selected as prediction reference(s) to the input frame.

The local video decoder (733) may decode coded video data of frames that may be designated as reference frames, based on symbols created by the source coder (730). Operations of the coding engine (732) may advantageously be lossy processes. When the coded video data may be decoded at a video decoder (not shown in FIG. 11), the reconstructed video sequence typically may be a replica of the source video sequence with some errors. The local video decoder (733) replicates decoding processes that may be performed by the video decoder on reference frames and may cause reconstructed reference frames to be stored in the reference picture cache (734). In this manner, the encoder (503) may store copies of reconstructed reference frames locally that have common content as the reconstructed reference frames that will be obtained by a far-end video decoder (absent transmission errors).

The predictor (735) may perform prediction searches for the coding engine (732). That is, for a new frame to be coded, the predictor (735) may search the reference picture memory (734) for sample data (as candidate reference pixel blocks) or certain metadata such as reference picture motion vectors, block shapes, and so on, that may serve as an appropriate prediction reference for the new pictures. The predictor (735) may operate on a sample block-by-pixel block basis to find appropriate prediction references. In some cases, as determined by search results obtained by the predictor (735), an input picture may have prediction references drawn from multiple reference pictures stored in the reference picture memory (734).

The controller (750) may manage coding operations of the video coder (730), including, for example, setting of parameters and subgroup parameters used for encoding the video data.

Output of all aforementioned functional units may be subjected to entropy coding in the entropy coder (745). The entropy coder translates the symbols as generated by the various functional units into a coded video sequence, by loss-less compressing the symbols according to technologies known to a person skilled in the art as, for example Huffman coding, variable length coding, arithmetic coding, and so forth.

The transmitter (740) may buffer the coded video sequence(s) as created by the entropy coder (745) to prepare it for transmission via a communication channel (760), which may be a hardware/software link to a storage device which would store the encoded video data. The transmitter (740) may merge coded video data from the video coder (730) with other data to be transmitted, for example, coded audio data and/or ancillary data streams (sources not shown).

The controller (750) may manage operation of the encoder (503). During coding, the controller (750) may assign to each coded picture a certain coded picture type, which may affect the coding techniques that may be applied to the respective picture. For example, pictures often may be assigned as one of the following frame types:

An Intra-Picture (I picture) may be one that may be coded and decoded without using any other frame in the sequence as a source of prediction. Some video codecs allow for different types of Intra-pictures, including, for example Independent Decoder Refresh Pictures. A person skilled in the art is aware of those variants of I pictures and their respective applications and features.

A Predictive picture (P picture) may be one that may be coded and decoded using intra-prediction or inter prediction using at most one motion vector and reference index to predict the sample values of each block.

A Bi-directionally Predictive Picture (B Picture) may be one that may be coded and decoded using intra-prediction or inter prediction using at most two motion vectors and reference indices to predict the sample values of each block. Similarly, multiple-predictive pictures can use more than two reference pictures and associated metadata for the reconstruction of a single block.

Source pictures commonly may be subdivided spatially into a plurality of sample blocks (for example, blocks of 4×4, 8×8, 4×8, or 16×16 samples each) and coded on a block-by-block basis. Blocks may be coded predictively with reference to other (already coded) blocks as determined by the coding assignment applied to the blocks' respective pictures. For example, blocks of I pictures may be coded non-predictively or they may be coded predictively with reference to already coded blocks of the same picture (spatial prediction or intra-prediction). Pixel blocks of P pictures may be coded non-predictively, via spatial prediction or via temporal prediction with reference to one previously coded reference pictures. Blocks of B pictures may be coded non-predictively, via spatial prediction or via temporal prediction with reference to one or two previously coded reference pictures.

The video coder (503) may perform coding operations according to a predetermined video coding technology or standard, such as H.265 HEVC. In its operation, the video coder (503) may perform various compression operations, including predictive coding operations that exploit temporal and spatial redundancies in the input video sequence. The coded video data, therefore, may conform to a syntax specified by the video coding technology or standard being used.

In an embodiment, the transmitter (740) may transmit additional data with the encoded video. The video coder (730) may include such data as part of the coded video sequence. Additional data may comprise temporal/spatial/SNR enhancement layers, other forms of redundant data such as redundant pictures and slices, Supplementary Enhancement Information (SEI) messages, Visual Usability Information (VUI) parameter set fragments, and so on.

The present disclosure is directed to various methods for a Cross-Component Linear Model Prediction Mode.

As described above, in this application, CCLM may refer to any variants of a Cross-Component Linear Model, such as LT_CCLM, T_CCLM, L_CCLM, MMLM, LT_MMLM, L_MMLM, and T_MMLM. Further, in this application, a smoothing filter may be defined as a linear filter with an odd number of taps, and filter coefficients thereof may be symmetric. For example, a 3-tap filter [1, 2, 1] and 5-tap filter [1, 3, 8, 3, 1] are both smoothing filters. An interpolation filter may be defined as a linear filter to generate a fractional position sample using integer position samples.

It is proposed that, an interpolation filter used for CCLM may be applied to a subset of the neighboring luma reconstructed samples in the specified region.

In one aspect, the specified neighboring sample region may be a left neighboring sample region used for L_CCLM and L_MMLM, or a top neighboring sample region used for T_CCLM and T_MMLM, or a top and a left neighboring sample region used for LT_CCLM and LT_MMLM.

In another aspect, the reconstructed luma samples in the specified region may be directly used to find the maximum and minimum values. After obtaining the maximum and minimum luma sample values, an interpolation (or smoothing) filter may be (e.g. only) applied to these two samples.

In another aspect, after obtaining the maximum and minimum luma sample values, the co-located positions of the minimum and maximum luma samples in a chroma neighboring sample region may be recorded as (x_min, y_min) and (x_max, y_max), respectively, and a downsample filter may be applied to the co-located luma samples for chroma samples with position (x_min, y_min) and (x_max, y_max).

In another aspect, for a 4:2:0 YUV format, the down-sample filter may be applied as follows: (x, y) in the following equation may be replaced by (x_min, y_min) or (x_max, y_max), $rec_L'^{(x,y)}$ may denote the down-sampled luma sample values, $rec_L^{(kx,ky)}$ may denote the constructed luma samples at the specified neighboring position (k·x, k·y), k may be a positive integer, such as 1, 2, 3, or 4.

$$rec_L'^{(x,y)} = (2 \times rec_L^{(kx,ky)} + 2 \times rec_L^{(kx,ky+1)} + rec_L^{(kx-1,ky)} + rec_L^{(kx-1,ky+1)} + rec_L^{(kx-1,ky+1)} + rec_L^{(kx-1,ky+1)}) >> 3$$

In another aspect, for a 4:2:0 YUV format, the co-located positions in a luma sample region for one chroma sample with position (x, y) may be any one of the following 6 positions (k*x, k*y), (k*x−1, k*y), (k*x+1, k*y), (k*x−1, k*y+1), (k*x, k*y+1), and (k*x+1, k*y+1). Where k is a positive integer, such as 1, 2, 3, or 4.

In another aspect, for 4:4:4 and 4:2:2 YUV formats, the interpolation filter described above can be used here.

In another aspect, the reconstructed luma samples in the specified region may be directly used to find the maximum and minimum values.

Figure 1:
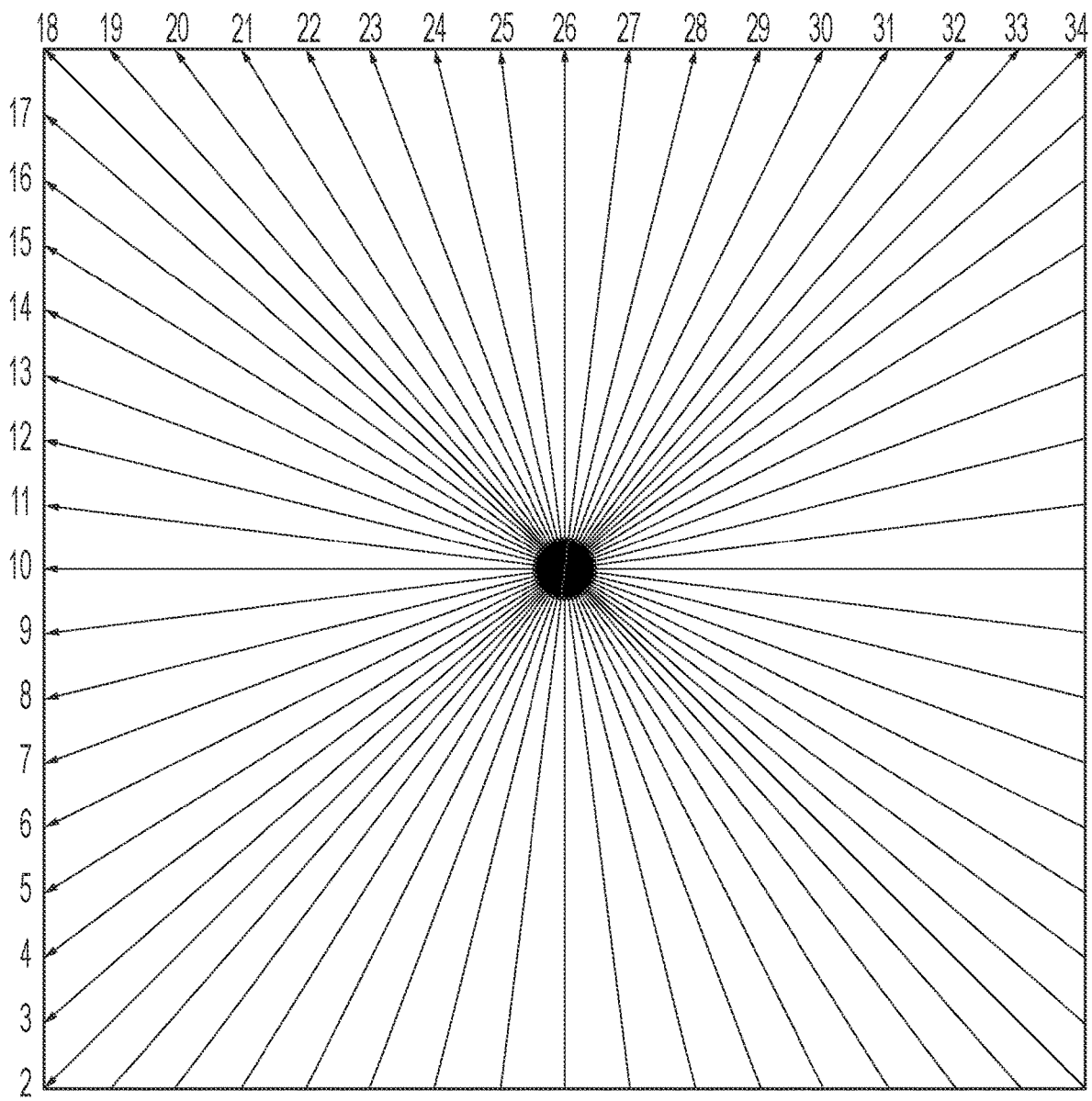
FIG. 1 is a diagram of a prediction model in accordance with an embodiment.
Figure 2:
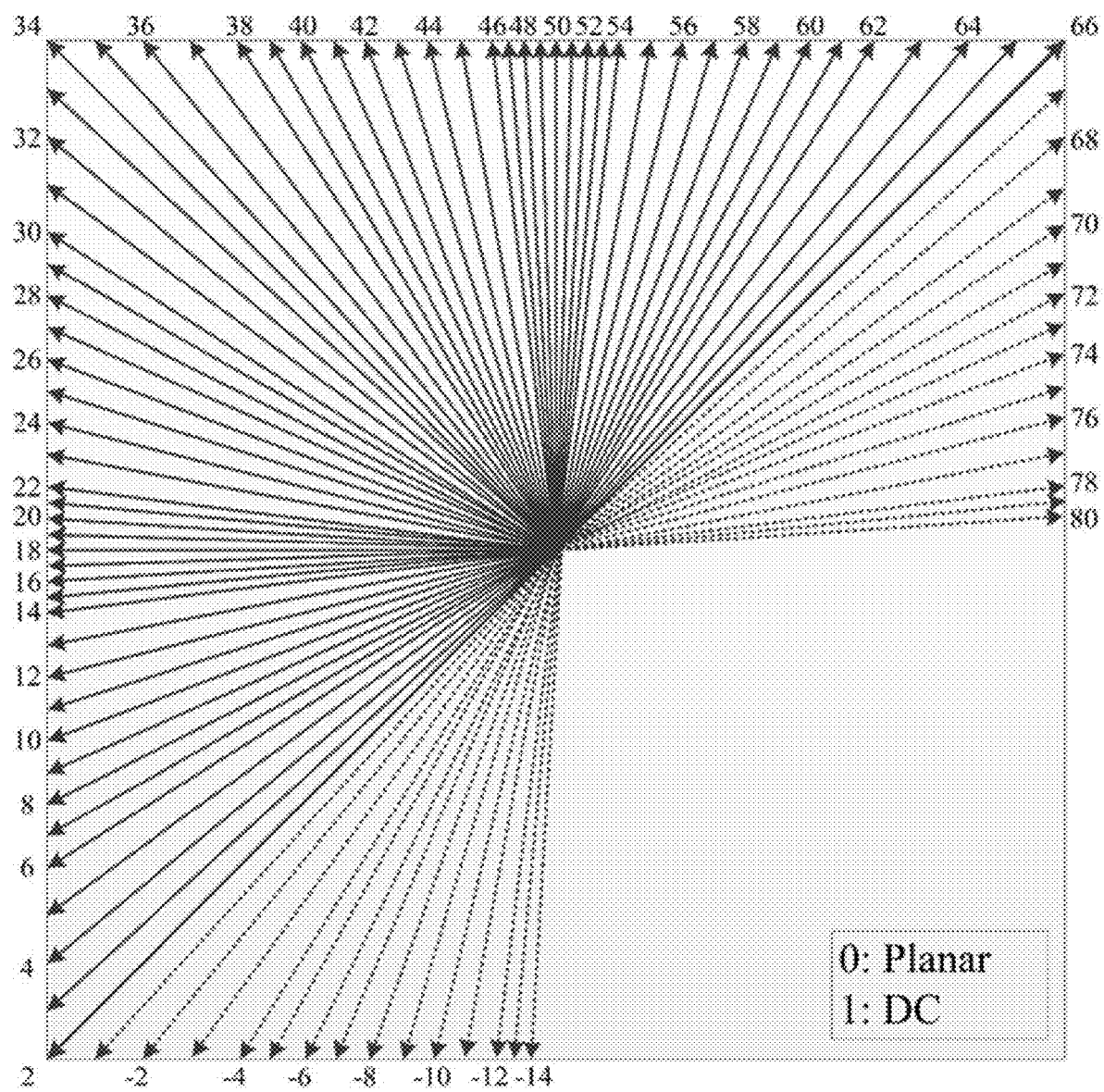
FIG. 2 is a diagram of a prediction model in accordance with an embodiment.
Figure 4:
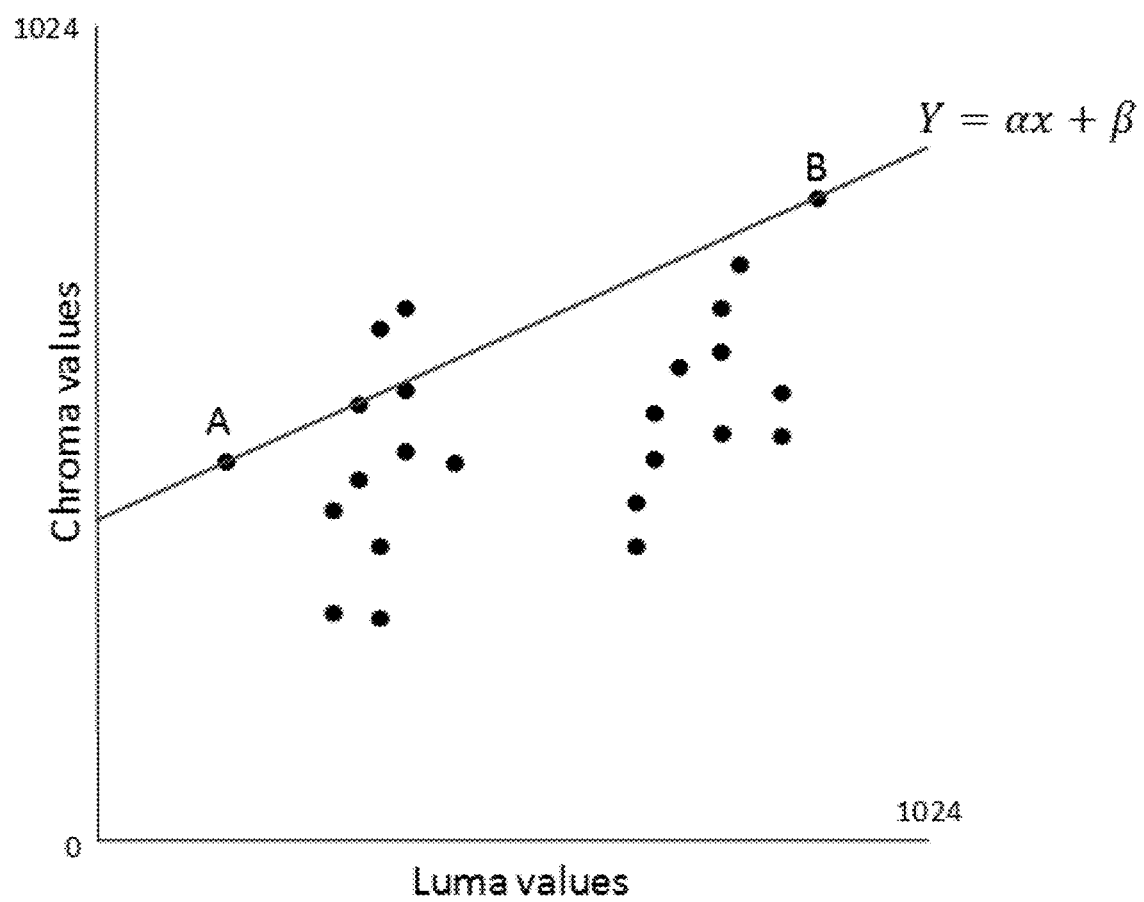
FIG. 4 is a diagram of different luma values in accordance with an embodiment.
Figure 5A:
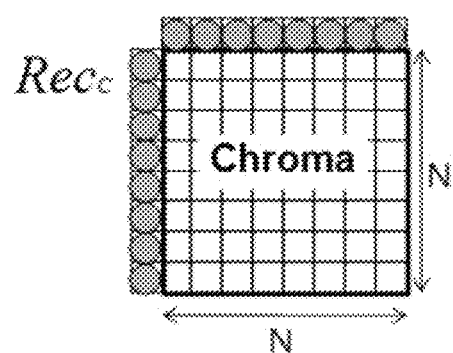
FIG. 5A is a diagram of samples used in cross-component linear modeling in accordance with an embodiment.
Figure 5B:
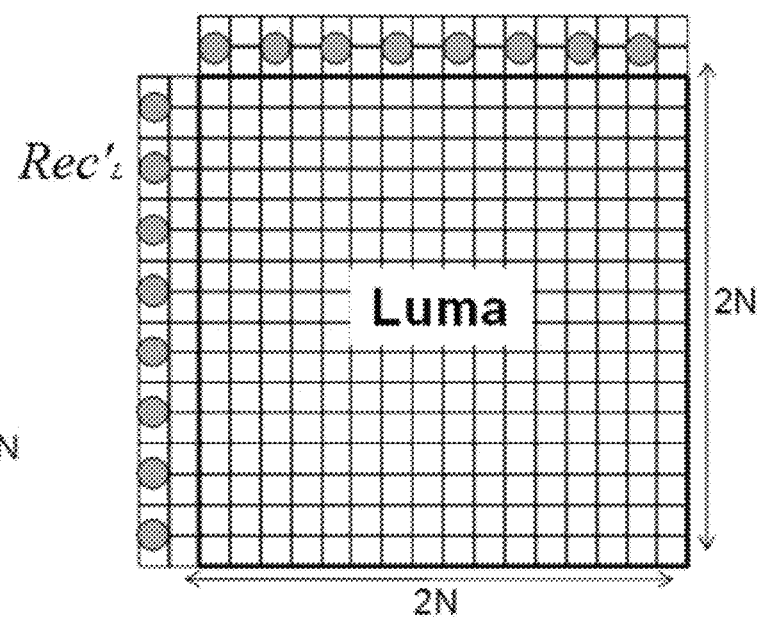
FIG. 5B is a diagram of samples used in cross-component linear modeling in accordance with an embodiment.
Figures 6A, 6B:
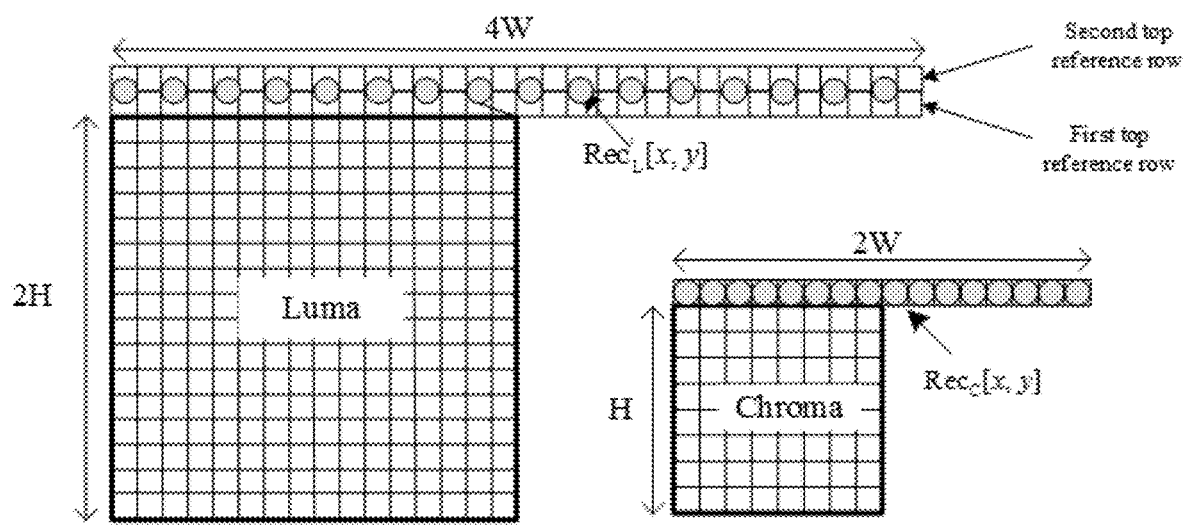
FIG. 6A is a diagram of samples used in cross-component linear modeling in accordance with an embodiment.
FIG. 6B is a diagram of samples used in cross-component linear modeling in accordance with an embodiment.
Figure 8:
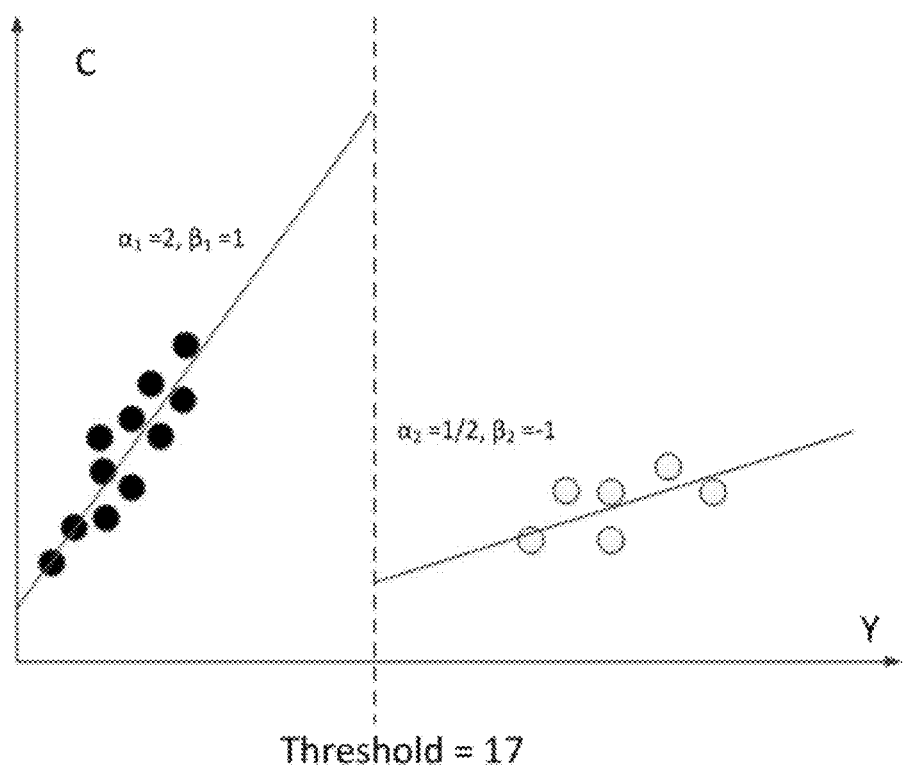
FIG. 8 is an example of a classification using a Multiple Model CCLM in accordance with an embodiment.

In another aspect, for a LT_CCLM mode, the neighboring luma samples in the first top reference row (as shown in FIGS. 6A-6B) and second left reference column (as shown in FIGS. 7A-7B) may be directly used to find the maximum and minimum values.

In another aspect, for a LT_CCLM mode, half of the neighboring luma samples in the first and second top reference row (as shown in FIGS. 6A-6B) and the samples in second left reference column (as shown in FIGS. 7A-7B) may be directly used to find the maximum and minimum values.

In another aspect, for a T_CCLM mode, the neighboring luma samples in the first top reference row may be directly used to find the maximum and minimum values.

In another aspect, for a T_CCLM mode, half of the neighboring luma samples in the first and second top reference row may be directly used to find the maximum and minimum values.

In another aspect, for a L_CCLM mode, the neighboring luma samples in the second left reference column may be directly used to find the maximum and minimum values.

In another aspect, when an interpolation filter is used (e.g. only used) on partial of the neighboring luma samples, a downsampling filter different from the one used in current CCLM, i.e., the 6-tap [1,2,1;1,2,1]/8 filter, may be applied. For example, the 10-tap filter may be [1,4,6,4,1; 1,4,6,4,1]/16

In another aspect, the downsampling filter may be an 8-tap filter, wherein the number of filter taps in the first (nearest to the current block) reference row (as shown in FIGS. 6A-6B) may be different from the other (farther to the current block) reference column (as shown in FIGS. 7A-7B). For example, the 8-tap filter may be [1,2,1; 1,2,6,2,1]/16, and the number of filter taps for the first reference row (or column) may be 5, whereas the number of taps for the second reference row (or column) may be 3.

In another aspect it is proposed that, the reconstructed chroma samples in the specified region may be used to find the maximum and minimum values.

In one aspect, after obtaining the maximum and minimum chroma sample values, interpolation (or smoothing)filter may be applied (e.g. only applied) to the co-located luma samples of these two chroma samples. For example, for a 4:2:0 YUV format, the interpolation (or smoothing) filter described above can be used. As another example, for a 4:2:0 YUV format, the co-located positions for one chroma sample with position (x,y) described above can be used here. In yet another example, for 4:4:4 and 4:2:2 YUV formats, the interpolation filter in the following description may be used here.

According to one aspect, it is proposed that, the interpolation filter (or smoothing filter) used in CCLM may be dependent on the YUV format, such as 4:4:4, 4:2:2, or 4:2:0 YUV format.

Figure 13:
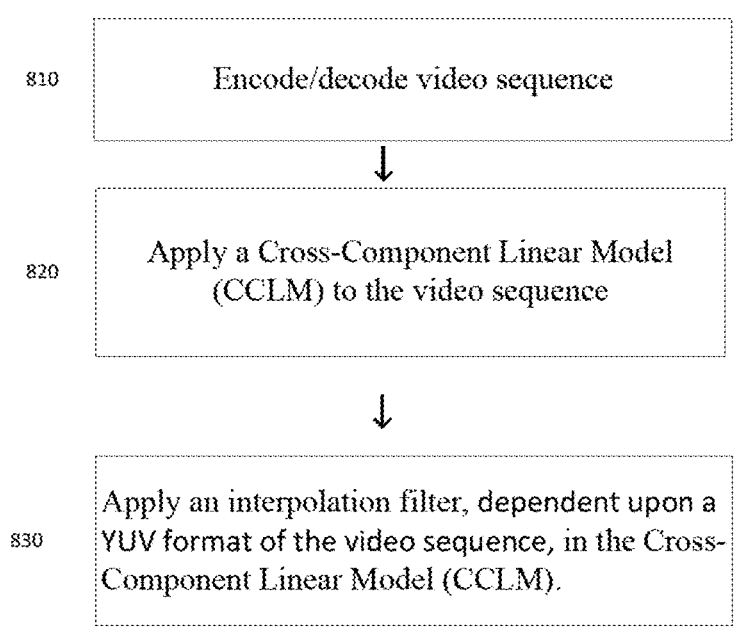
FIG. 13 is a flowchart of an example process for encoding or decoding a video sequence in accordance with an embodiment.
Figure 14:
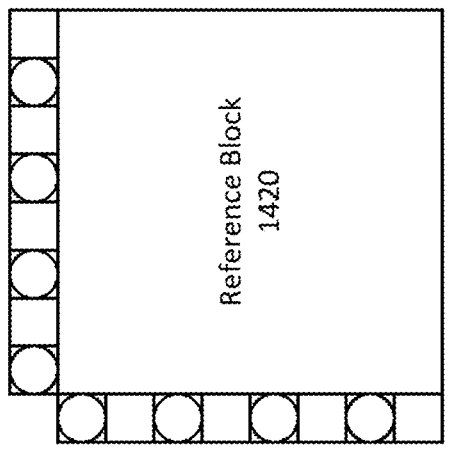
FIG. 14A is a diagram of neighboring samples that are used for deriving Illumination Compensation (IC) parameters.
FIG. 14B is a diagram of neighboring samples that are used for deriving Illumination Compensation (IC) parameters.
Figure 14:
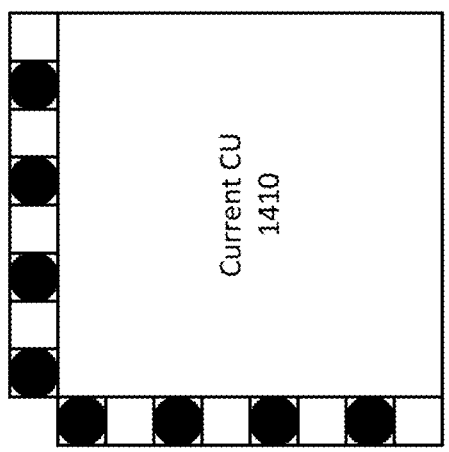

FIG. 13 is a flowchart of an example process (800) for encoding or decoding a video sequence. In some implementations, one or more process blocks of FIG. 13 may be performed by decoder (510). In some implementations, one or more process blocks of FIG. 13 may be performed by another device or a group of devices separate from or including decoder (510), such as encoder (503).

As shown in FIG. 13, process (800) may comprise encoding or decoding a video sequence (810).

As further shown in FIG. 13, process (800) may further comprise applying a Cross-Component Linear Model (CCLM) to the video sequence (820).

As further shown in FIG. 13, process (800) may further comprise applying an interpolation filter in the Cross-Component Linear Model (CCLM), wherein the interpolation filter is dependent upon a YUV format of the video sequence (830).

Although FIG. 13 shows example blocks of process (800), in some implementations, process (800) may include additional blocks, fewer blocks, different blocks, or differently arranged blocks than those depicted in FIG. 13. Additionally, or alternatively, two or more of the blocks of process (800) may be performed in parallel.

According to another aspect, the taps of interpolation (or smoothing) filter used in CCLM may be dependent on YUV formats.

In another aspect, the taps of the interpolation (or smoothing) filter used in CCLM may be the same for the same YUV format. For example, the taps of an interpolation filter used in CCLM may be the same for a 4:2:0 YUV format.

In another aspect, the interpolation or smoothing filter for 4:4:4 and 4:2:2 YUV formats is the same, but different with a filter for 4:2:0 YUV format. For example, a 3-tap (1,2,1) filter may be used for 4:4:4 and 4:2:2 YUV formats whereas a 6-tap (1,2,1;1,2,1) filter may be used for a 4:2:0 YUV format. As another example, no down-sample (or smoothing) filter may be used for 4:4:4 and 4:2:2 YUV formats, whereas a 6-tap (1,2,1,1,2,1) or a 3-tap (1,2,1) filter may be used for a 4:2:0 YUV format.

According to another aspect, the taps of an interpolation (or smoothing) filter used in CCLM may be different for different YUV formats. For example, a 5-tap (1,1,4,1,1) filter may be used for a 4:4:4 YUV format, a (1,2,1) filter may be used for a 4:2:2 YUV format, and a 6 tap (1,2,1,1,2,1) filter may be used for a 4:2:0 YUV format.

In another aspect, the interpolation (or smoothing) filter may be different for top and left neighboring luma in reconstructed samples.

According to another aspect, the interpolation (or smoothing) filter for top and left neighboring luma reconstructed samples may be dependent on the YUV formats.

According to another aspect, for a 4:2:2 YUV format, the interpolation (or smoothing) filter may be different for top and left neighboring samples. For example, for a 4:2:2 YUV format, (1,2,1) the filter may be applied to top neighboring luma samples and no interpolation (or smoothing) filter is applied to left neighboring luma samples.

According to another aspect, the number of lines in top neighboring luma samples and the number of columns in left neighboring luma samples used in CCLM may be dependent on the YUV format. For example, only one row in a top neighboring region or/and one column in a left neighboring region may be used for 4:4:4 YUV or 4:2:2 YUV format. As another example, one row in a top neighboring region and/or 3 (or 2) columns in a left neighboring region may be used for a 4:2:2 YUV format.

In another aspect, it is proposed that, the absolute difference between maximum and minimum luma sample values within the specified neighboring sample regions, denoted by diff_Y, is non-uniform quantized, and the quantized value of the absolute difference may be used to specify the entry index of the CCLM Look-up Table (LUT) such that the size of LUT is reduced. The range of diff_Y may be divided into two intervals, if diff_Y is lower than or equal to a threshold, named as Thres_1, one step size may be used, named as Step_A. Otherwise, another step size is used, named as Step_B. Consequently, the parameter a in CCLM may be obtained as follows:

$$a = (\textit{diff}_Y > \text{Thres\_1})?LUT\left[\frac{\text{Thres\_1}}{\text{Step\_A}} + \frac{\text{diff\_Y} - \text{Thres\_1}}{\text{Step\_B}} - 1\right]:$$
$$LUT[\text{diff\_Y/Step\_A} - 1]$$

Here in this aspect, Thres_1 may be set to equal to 64, Step_A may be set equal to 1, and Step_B may be set equal to 8

Now, below will be described a modified CCLM parameter derivation process on top of VVC draft 3 clause 8.2.4.2.8.

According to another aspect, in the equation immediately above, the variables a, b, and k may be derived as follows:
 If numSampL is equal to 0, and numSampT is equal to 0, the following applies:
  k=0
  a=0
  b=1<<(BitDepth$_C$−1)
 Otherwise, the following applies:
  shift=(BitDepth$_C$>8) ? BitDepth$_C$—9:0
  add=shift ? 1<<(shift−1):0
  diff=(maxY−minY+add)>>shift
  k=16
   If diff is greater than 0, the following applies:
    diff=(diff>64) ? (56+(diff>>3)):diff
     a=((maxC−minC)*g_aiLMDivTableHigh[diff−1]+add)>>shift
   Otherwise, the following applies:
    a=0
  b=min$_C$−((a*minY)>>k)

Here, the prediction samples predSamples[x][y] with x=0 . . . nTbW−1, y=0 . . . nTbH−1 may be derived as follows:
 predSamples[x][y]=Clip1C(((pDsY[x][y]*a)>>k)+b)

Further, the simplified CCLM look-up table is shown below:
 int g_aiLMDivTableHigh[ ]={
 65536, 32768, 21845, 16384, 13107, 10922, 9362, 8192, 7281, 6553, 5957, 5461, 5041, 4681, 4369, 4096,
 3855, 3640, 3449, 3276, 3120, 2978, 2849, 2730, 2621, 2520, 2427, 2340, 2259, 2184, 2114, 2048,
 1985, 1927, 1872, 1820, 1771, 1724, 1680, 1638, 1598, 1560, 1524, 1489, 1456, 1424, 1394, 1365,
 1337, 1310, 1285, 1260, 1236, 1213, 1191, 1170, 1149, 1129, 1110, 1092, 1074, 1057, 1040, 1024,
 910, 819, 744, 682, 630, 585, 546, 512, 481, 455, 431, 409, 390, 372, 356, 341,
 327, 315, 303, 292, 282, 273, 264, 256, 248, 240, 234, 227, 221, 215, 210, 204, 199, 195, 190, 186, 182, 178, 174, 170, 167, 163, 160, 157, 154, 151, 148, 146,
143, 141, 138, 136, 134, 132, 130, 128,};

In embodiments, an absolute difference between maximum and minimum luma sample values within specified neighboring sample regions, denoted by diff_Y, is non-uniform quantized, and a quantized value of the absolute difference is used to specify an entry index of a CCLM Look-up Table (LUT) such that a size of LUT is reduced.

For example, a specified neighboring sample region may be a left neighboring sample region used for L_CCLM and L_MMLM, or a top neighboring sample region used for T_CCLM and T_MMLM, or top and left neighboring sample regions used for TL_CCLM and TL MMLM.

In another example, a range of diff_Y is divided into multiple intervals, and different quantization step sizes are used in different intervals. In first embodiments, the range of diff_Y is divided into two intervals; if diff_Y is lower than or equal to a threshold, named as Thres_1, one step size is used, named as Step_A. Otherwise, another step size is used, named as Step_B. Consequently, a parameter a in CCLM may be obtained as follows:

$$a = (diff_Y > \text{Thres\_1}) ? LUT[\text{diff\_Y/Step\_A} - 1] :$$
$$LUT\left[\frac{\text{Thres\_1}}{\text{Step\_A}} + \frac{\text{diff\_Y} - \text{Thres\_1}}{\text{Step\_B}} - 1\right]$$

Each of Thres_1, Step_A, and Step_B can be any positive integer, such as 1, 2, 3, 4, and so on. Step_A and Step_B are not equal. In an example, Thres_1 is set equal to 32, or 48, or 64. In another example, Thres_1 is set equal to 64, Step_A is set equal to 1, and Step_B is set equal to 8. In another example, Thres_1 is set equal to 64, Step_A is set equal to 2 (or 1), and Step_B is set equal to 8 (or 4). In another example, a value of Step_A is smaller than a value of Step_B.

In second embodiments, the range of diff_Y is divided into three intervals by two thresholds, namely Thres_1 and Thres_2. If diff_Y is lower than or equal to Thres_1, one step size is used, namely Step_A; otherwise, if diff_Y is lower than or equal to Thres_2, another step size is used, namely Step_B; otherwise, a third step size is used, namely Step_C. Each of Thres_1, Thres_2, Step_A, Step_B, and Step_C can be any positive integer, such as 1, 2, 3, 4, and so on. Thres_1 is less than Thres_2. Step_A, Step_B, and Step_C are not equal. In an example, Thres_1 and Thres_2 are set equal to 64 and 256, respectively. In another example, Step_A, Step_B, and Step_C are set equal to 2 (or 1), 8 (or 4), and 32 (or 16), respectively.

In third embodiments, threshold values that are used for specifying intervals (such as the Thres_1 and Thres_2) are powers of 2, e.g., 2, 4, 8, 16, 32, 64, 128, 256, 512, 1024.

In further embodiments, LIC re-uses a max-min method in CCLM to derive parameters a and b.

For example, LIC re-uses a Look-up table in CCLM to avoid a division operation.

In another example, LIC uses a same neighboring reconstructed sample region as that used for a luma component in TL_CCLM to derive parameters a and b.

In another example, LIC re-uses a same down-sample method in CCLM to filter neighboring reconstructed samples.

In further embodiments, only a subset of neighboring reconstructed samples in a specified region is used to calculate maximum and minimum sample values for a max-min method in CCLM prediction mode.

Figure 15:
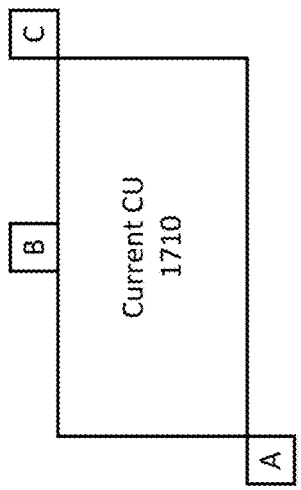
FIGS. 15, 16, 17, 18, 19, 20, 21, 22, 23 and 24 are diagrams of a current Coding Unit (CU) and a subset of neighboring reconstructed samples of the current CU that are used to calculate maximum and minimum sample values, according to embodiments.

For example, only 4 samples in a neighboring reconstructed sample region are used to calculate maximum and minimum sample values regardless of a block size of a current block. In this example, a position of selected 4 samples are fixed and shown in FIG. 15. To be specific, with respect to a current CU 1510, only sample values of neighboring reconstructed samples at position A, B, C, and D are used for calculating maximum and minimum sample values.

In another example, for TL_CCLM mode, only left (or above) neighboring samples are used to calculate a minimum sample value and only above (or left) neighboring samples are used to calculate a maximum sample value.

In another example, instead of finding maximum and minimum sample values for a max-min method in CCLM prediction mode, a mean value of top luma and chroma reference samples, namely top_mean_luma, top_mean_chroma, and a mean values of left luma and chroma reference samples, namely, left_mean_luma, left_mean_chroma, may be used to derive CCLM parameters.

Figure 16:
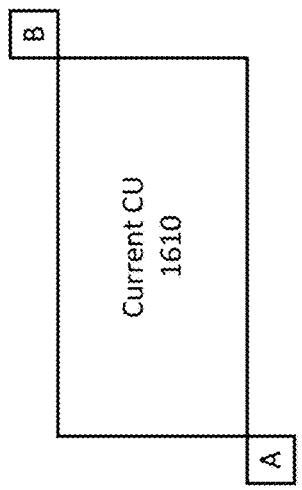

In the following embodiments, referring to FIG. 16, when a top-left sample and a bottom-left sample of a current CU 1610 are used, these blocks may be replaced with their direct neighboring samples that are located outside a range of an above and left sample of the current CU 1610. For example, in FIG. 16, samples A and B may be used.

Figure 17:
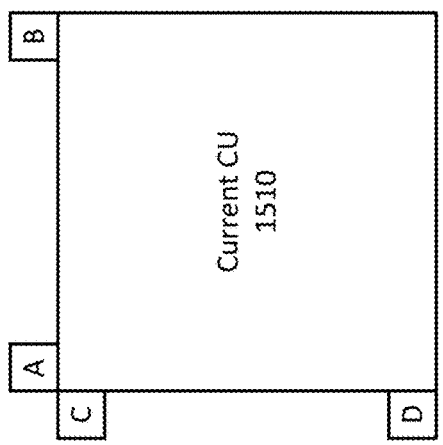

In another example, in FIG. 17, samples A, B and C may be used in a current CU 1710.

In the following embodiments, the chroma sample (in U or V component) together with its co-located luma sample is named as a sample pair. Alternatively, for LIC, a neighboring sample of a current block together with a neighboring sample in a co-located position of a reference block is named as a sample pair, so the samples included in the sample pair comes from a same color component (luma, U or V).

In the following embodiments, for CCLM or any variant/extension of CCLM mode, a block size may be of a chroma block. For LIC mode or any variant of LIC, a block size may be of a current block of a current color component (luma, U or V).

In embodiments, up to N neighboring reconstructed sample pairs in a specified region is used to calculate maximum and minimum sample values for a max-min method in CCLM prediction mode, and N is a positive integer such as 4, 8, or 16.

Figure 18:
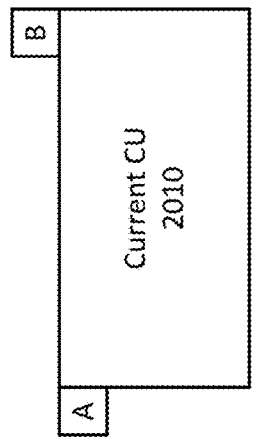
Figure 19:
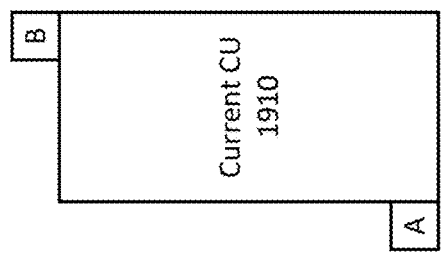
Figure 20:
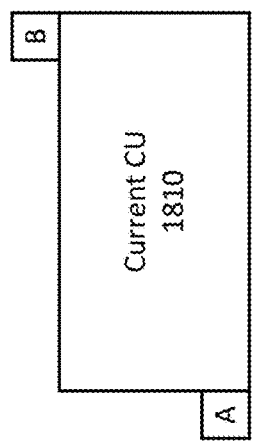

For example, for an N×2 or 2×N chroma block, only one neighboring sample pair from left and one neighboring sample pair from above are used to calculate maximum and minimum sample values. A position of a used neighboring sample pair is fixed. In an example, a position of a chroma sample in a sample pair is shown in FIGS. 18 and 19 for current CUs 1810 and 1910, respectively. In another example, a position of a chroma sample in a sample pair is shown in FIG. 20 for a current CU 2010.

Figure 21:
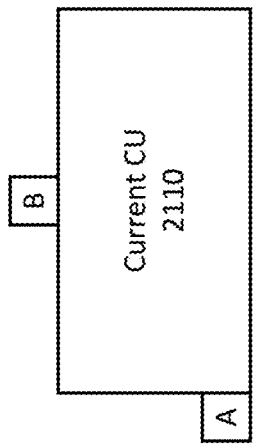

In another example, a position of a chroma sample in a sample pair is shown in FIG. 21 for a current CU 2110, wherein sample B can be at any position on a longer side of the current CU 2110. As shown in FIG. 21, sample B is at a middle of the longer side of the current CU 2110. An x-coordinate of sample B may be (width>>1)−1 or (width>>1) or (width>>1)+1.

Figure 22:
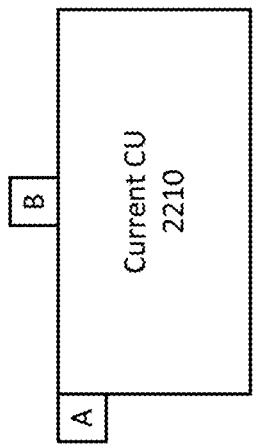

In another example, a position of a chroma sample in a sample pair is shown in FIG. 22 for a current CU 2210, wherein sample B can be at any position on a longer side of the current CU 2210. As shown in FIG. 22, sample B is at a middle of the longer side of the current CU 2210. An x-coordinate of sample B may be (width>>1)−1 or (width>>1) or (width>>1)+1.

Figure 23:
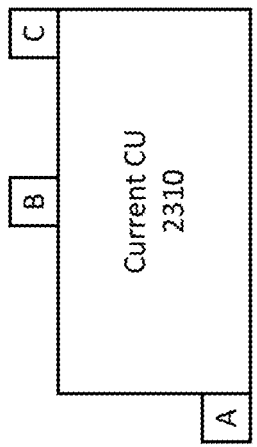

In another example, for 2×N or N×2 chroma blocks, N can be any positive integer, such as 2, 4, 8, 16, 32, or 64. When N is equal to two, only one neighboring sample pair from left and one neighboring sample pair from above are used to calculate maximum and minimum sample values. Otherwise, when N is larger than 2, only one neighboring sample pair from a short side and two or more neighboring sample pairs from a longer side of a current CU are used to calculate maximum and minimum sample values. A position of a used neighboring sample pair is fixed. In an example, positions of a chroma sample in a sample pair are shown in FIG. 23 for a current CU 2310, wherein sample B is at a middle of a longer side of the current CU 2310 and sample C is at an end of the longer side.

Figure 24:
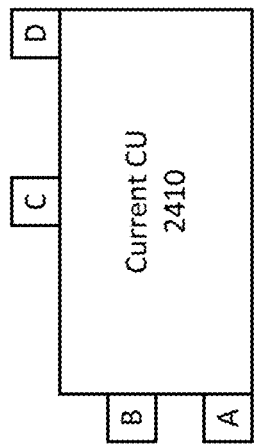

In another example, for a chroma block, when both a width and a height of a current block are larger than 2, two or more sample pairs from a left side and two or more sample pairs from an above side of the current block are used to calculate maximum and minimum sample values. A position of the used neighboring sample pair is fixed. In an example, referring to FIG. 24, for each side of a current CU 2410, one sample is in a middle of a side (such as samples B and C) and another sample is at an end of the side (such as samples A and D).

Figure 26:
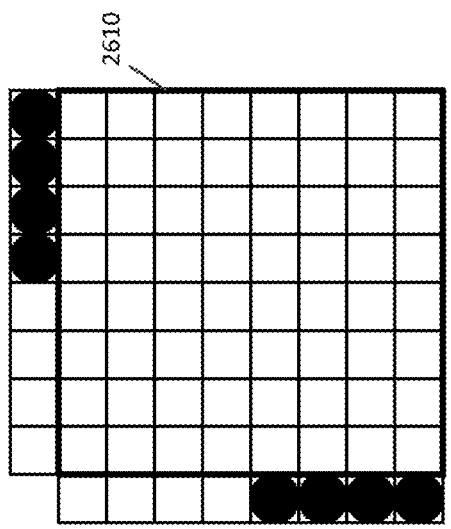
FIGS. 25 and 26 are diagrams of a chroma block and selected neighboring samples of the chroma block that are used to calculate maximum and minimum sample values, according to embodiments.
Figure 25:
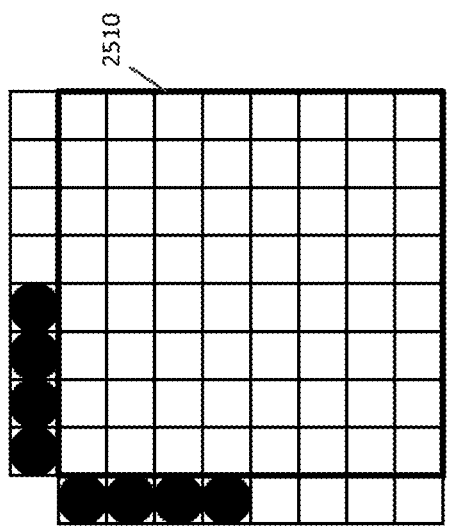

In another example, for CCLM mode, only a subset of neighboring samples in specified neighboring samples are used for calculating maximum and minimum sample values. A number of selected samples is dependent on a block size. In an example, a number of selected neighboring samples are the same for a left side and an above side. For a chroma block, used samples are selected by a specified scanning order. Referring to FIG. 25, for a left side of a chroma block 2510, a scanning order is from top to bottom, and for an above side, a scanning order is from left to right. Selected neighboring samples are highlighted with dark circles. Referring to FIG. 26, for a chroma block 2610, used samples are selected by a reversed scanning order. That is, for a left side of the chroma block 2610, a scanning order is from bottom to top, and for an above side, a scanning order is from right to left. A number of selected neighboring samples are the same for the left side and the above side, and the selected neighboring samples are highlighted with dark circles.

In further embodiments, for CCLM mode, different down-sampling (or interpolation) filter types are used for left neighboring luma samples and above neighboring luma samples.

Figures 27, 28:
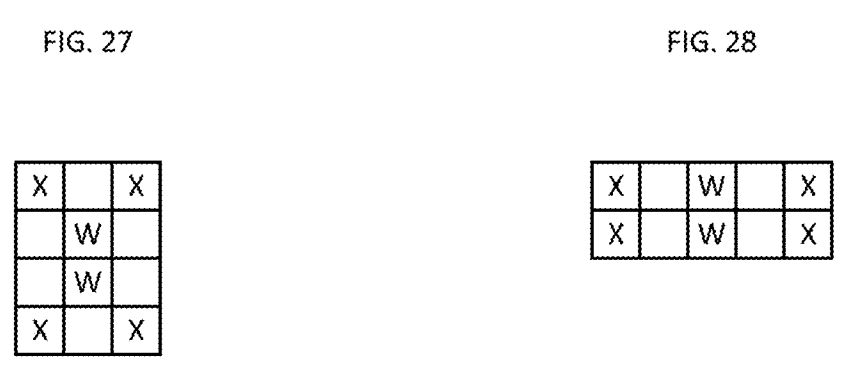

For example, a number of filter types are the same for left and above neighboring samples, but a position of filters used for left and above neighboring samples are different. Referring to FIG. 27, positions of filters for luma samples in a left side are shown, where W and X indicate coefficients of the filters, and block indicate positions of the luma samples. Referring to FIG. 28, a position of filters for luma samples in an above side are shown, where W and X indicate coefficients of the filters, and block indicate positions of the luma samples.

In further embodiments, up to N neighboring reconstructed sample pairs in a specified region are used to calculate parameter a and b in a linear model prediction mode, and N is a positive integer such as 4, 8, or 16. A value of N may be dependent on a block size of a current block.

For example, LIC and CCLM (or any variant of CCLM, such as L_CCLM, T_CCLM, or LT_CCLM) share the same neighboring sample positions to calculate linear model parameters a and b.

In another example, samples pairs that are used for calculating parameters a and b of LIC may be located at different positions for different color components. The sample pairs for the different color components may be decided independently, but an algorithm may be the same, e.g., using minimum and maximum sample values for deriving model parameters.

In another example, a first sample pair that is used for calculating parameters a and b of LIC for one color component (e.g., luma) is first located, then sample pairs that are used for calculating the parameters a and b of LIC for another component (e.g., U or V) is then decided as co-located samples with the first sample pair.

In another example, LIC and CCLM (or any variant of CCLM, such as L_CCLM, T_CCLM, or LT_CCLM) share the same method, such as a least square error method or a max-min method, to calculate linear model parameters a and b. Both the LIC and CCLM may use the max-min method to calculate the linear model parameters a and b. For LIC, a sum of absolute values of two samples in each sample pair may be used to calculate maximum and minimum values of a linear model.

In another example, there are three kinds of LIC modes, LT_LIC, L_LIC, and T_LIC. For LT_LIC, both left and above neighboring samples are used to derive linear model parameters a and b. For L_LIC, only left neighboring samples are used to derive the linear model parameters a and b. For T_LIC, only top neighboring samples are used to derive the linear model parameters a and b. If a current mode is LIC mode, another flag may be signaled to indicate whether LT_LIC mode is selected. If not, one additional flag may be signaled to indicate whether L_LIC mode or T_LIC mode is signaled.

In another example, for N×2 or 2×N block, only two neighboring sample pairs are used to calculate parameters a and b in a linear model prediction mode (or to calculate maximum and minimum sample values). Positions of used neighboring sample pairs are predefined and fixed.

In embodiments of this example, for a linear model prediction mode, which uses both sides for calculating parameters a and b, if both left and above neighboring samples are available, only one neighboring sample pair from the left and one neighboring sample pair from above are used to calculate the parameters a and b in the linear model prediction mode.

Figure 29:
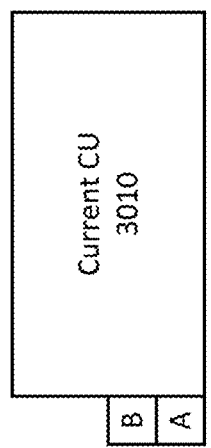
FIGS. 29 and 30 are diagrams of a current CU and a neighboring sample pair of the current CU that are used to calculate parameters in a linear model prediction mode, according to embodiments.
Figure 30:
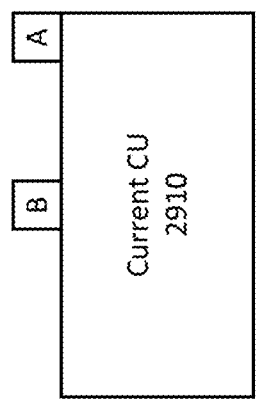

In embodiments of this example, for a linear model prediction mode, which uses both sides for calculating parameters a and b, if left or above neighboring samples are not available, two neighboring sample pairs from an available side are used to calculate the parameters a and b in the linear model prediction mode. Two examples of predefined positions for current CUs 2910 and 3010 respectively are shown in FIGS. 29 and 30.

In embodiments of this example, for a linear model prediction mode, which uses both sides for calculating parameters a and b, if left or above neighboring samples are not available, the parameters a and b are set to default values, such as a being set to 1 and b being set to 512.

In embodiments of this example, positions of a sample pair are shown in FIGS. 18 and 19.

In embodiments of this example, positions of a sample pair are shown in FIG. 20.

In embodiments of this example, positions of a sample pair are shown in FIG. 21, wherein sample B can be at any position on a longer side of the current CU 2110. For example, sample B may be at a middle of the longer side. In another example, an x-coordinate of sample B may be (width>>1)−1 or (width>>1) or (width>>1)+1.

In embodiments of this example, positions of a sample pair are shown in FIG. 22, wherein sample B can be at any position on a longer side of the current CU 2210. For example, sample B may be on a middle of the longer side. In another example, an x-coordinate of sample B may be (width>>1)−1 or (width>>1) or (width>>1)+1.

In another example, for 2×N or N×2 blocks, N can be any positive integer, such as 2, 4, 8, 16, 32, or 64. When N is equal to two, only one neighboring sample pair from a left side and one neighboring sample pair from an above side are used to calculate linear model parameters a and b. Otherwise, when N is larger than 2, only one neighboring sample pair from a shorter side and two or more neighboring sample pairs from a longer side are used to calculate the linear model parameters a and b. Positions of a used neighboring sample pair are predefined and fixed. Referring to FIG. 23, positions of a sample pair are shown, wherein Sample B can be at any position on a longer side of the current CU 2310. Sample B is in a middle of the longer side, and sample C is at an end of the longer side.

In another example, K1 or more sample pairs from a left side and K2 or more sample pairs from an above side are used to calculate linear model parameters a and b. Positions of used neighboring sample pairs are predefined and fixed. In addition, a number of selected samples, such as K, is dependent on a block size. Each of K1 and K2 is a positive integer, such as 1, 2, 4, 8. K1 and K2 may be equal.

In embodiments of this example, selected sample pairs on each side are evenly distributed.

In embodiments of this example, values of K1 and K2 should be equal to or smaller than a width and/or a height of a current block.

Figure 33:
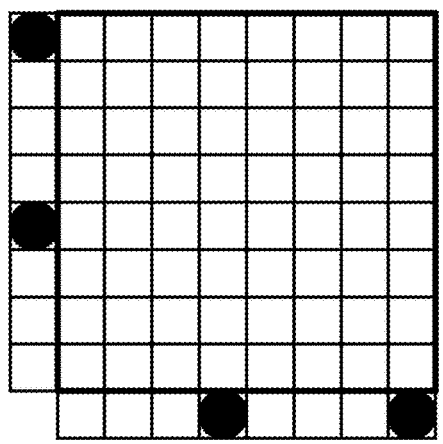
FIGS. 31, 32, 33, 34, 35 and 36 are diagrams of diagrams of a block and selected neighboring samples of the block that are used to calculate linear model parameters, according to embodiments.
Figure 32:
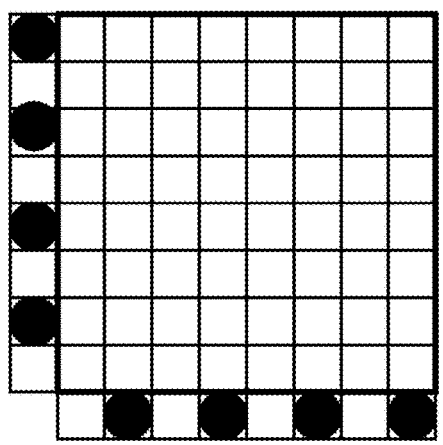
Figure 31:
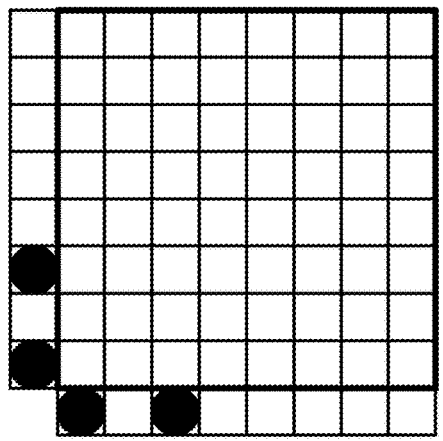

In embodiments of this example, neighboring samples are selected by a specified scanning order. A selection process finishes if a number of the selected samples meets a specified number. The number of selected samples on a left side and an above side may be the same. For the left side, a scanning order may be from top to bottom, and for the above side, a scanning order may be from left to right. Referring to FIGS. 25 and 31, selected neighboring samples are highlighted with dark circles. In FIG. 25, the neighboring samples are not down-sampled, and in FIG. 31, the neighboring samples are down-sampled. Alternatively, neighboring samples may be selected by a reversed scanning order. That is, for the left side, the scanning order may be from bottom to top, and for the above side, the scanning order may be from right to left. Referring to FIGS. 26, 32 and 33, positions of selected samples are shown. In FIG. 26, neighboring samples are not down-sampled, and in FIGS. 32 and 33, neighboring samples are down-sampled.

In embodiments of this example, when both a width and a height of a current block are larger than Th, K or more sample pairs from a left side and two or more sample pairs from an above side are used to calculate linear model parameters a and b. Positions of used neighboring sample pairs are predefined and fixed. Th is a positive integer, such as 2, 4, or 8. K is a positive integer, such as 2, 4, 8.

In embodiments of this example, when left or above neighboring samples are not available, K samples from an available side are used to derive parameters a and b.

In another example, for a linear model only using left side or above side neighboring samples, such as T_CCLM or L_CCLM, when a size of a used side, such as an above side for T_CCLM or a left side for L_CCLM, is equal to 2, only M samples are used. M is a positive integer, such as 2 or 4, and positions are predefined. Otherwise, up to N samples are used. N is a positive integer, such as 4 or 8. M may be not equal to N.

Figure 34:
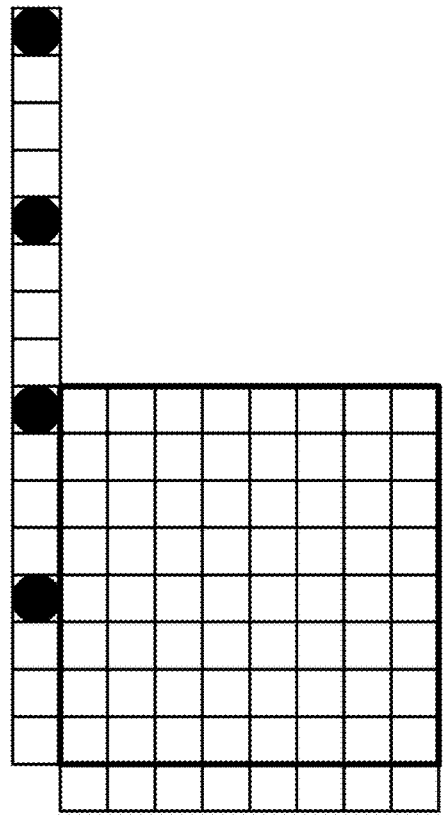

In embodiments of this example, referring to FIG. 34, when a size of a used side is larger than 2, predefined positions are shown, wherein an above side is used.

Figure 36:
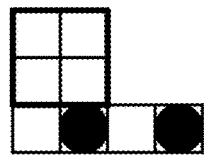
Figure 35:
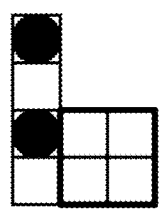

In embodiments of this example, referring to FIGS. 35 and 36, when a size of a used side is equal to 2, predefined positions are shown, wherein an above side is used in FIG. 35 and a left side is used in FIG. 36.

Further, the proposed methods may be implemented by processing circuitry (e.g., one or more processors or one or more integrated circuits). In one example, the one or more processors execute a program that is stored in a non-transitory computer-readable medium to perform one or more of the proposed methods.

The techniques described above, can be implemented as computer software using computer-readable instructions and physically stored in one or more computer-readable media. For example, FIG. 37 shows a computer system (3700) suitable for implementing certain embodiments of the disclosed subject matter.

The computer software can be coded using any suitable machine code or computer language, that may be subject to assembly, compilation, linking, or like mechanisms to create code comprising instructions that can be executed directly, or through interpretation, micro-code execution, and the like, by computer central processing units (CPUs), Graphics Processing Units (GPUs), and the like.

The instructions can be executed on various types of computers or components thereof, including, for example, personal computers, tablet computers, servers, smartphones, gaming devices, internet of things devices, and the like.

The components shown in FIG. 37 for computer system (3700) are exemplary in nature and are not intended to suggest any limitation as to the scope of use or functionality of the computer software implementing embodiments of the present disclosure. Neither should the configuration of components be interpreted as having any dependency or requirement relating to any one or combination of components illustrated in the exemplary embodiment of a computer system (3700).

Computer system (3700) may include certain human interface input devices. Such a human interface input device may be responsive to input by one or more human users through, for example, tactile input (such as: keystrokes, swipes, data glove movements), audio input (such as: voice, clapping), visual input (such as gestures), olfactory input (not depicted). The human interface devices can also be used to capture certain media not necessarily directly related to conscious input by a human, such as audio (such as: speech, music, ambient sound), images (such as: scanned images, photographic images obtain from a still image camera), video (such as two-dimensional video, three-dimensional video including stereoscopic video).

Input human interface devices may include one or more of (only one of each depicted): keyboard (3701), mouse (3702), trackpad (3703), touch screen (3710), data-glove (3704), joystick (3705), microphone (3706), scanner (3707), camera (3708).

Computer system (3700) may also include certain human interface output devices. Such human interface output devices may be stimulating the senses of one or more human users through, for example, tactile output, sound, light, and smell/taste. Such human interface output devices may include tactile output devices (for example tactile feedback by the touch-screen (3710), data-glove (3704), or joystick (3705), but there can also be tactile feedback devices that do not serve as input devices), audio output devices (such as: speakers 3709, headphones (not depicted)), visual output devices (such as screens 3710 to include cathode ray tube (CRT) screens, liquid-crystal display (LCD) screens, plasma screens, organic light-emitting diode (OLED) screens, each with or without touch-screen input capability, each with or without tactile feedback capability—some of which may be capable to output two dimensional visual output or more than three dimensional output through means such as stereographic output; virtual-reality glasses (not depicted), holographic displays and smoke tanks (not depicted)), and printers (not depicted).

Computer system (3700) can also include human accessible storage devices and their associated media such as optical media including CD/DVD ROM/RW (3720) with CD/DVD or the like media (3721), thumb-drive (3722), removable hard drive or solid state drive (3723), legacy magnetic media such as tape and floppy disc (not depicted), specialized ROM/ASIC/PLD based devices such as security dongles (not depicted), and the like.

Those skilled in the art should also understand that term "computer readable media" as used in connection with the presently disclosed subject matter does not encompass transmission media, carrier waves, or other transitory signals.

Computer system (3700) can also include interface(s) to one or more communication networks. Networks can for example be wireless, wireline, optical. Networks can further be local, wide-area, metropolitan, vehicular and industrial, real-time, delay-tolerant, and so on. Examples of networks include local area networks such as Ethernet, wireless LANs, cellular networks to include global systems for mobile communications (GSM), third generation (3G), fourth generation (4G), fifth generation (5G), Long-Term Evolution (LTE), and the like, TV wireline or wireless wide area digital networks to include cable TV, satellite TV, and terrestrial broadcast TV, vehicular and industrial to include CANBus, and so forth. Certain networks commonly require external network interface adapters (3754) that attached to certain general purpose data ports or peripheral buses (3749) (such as, for example universal serial bus (USB) ports of the computer system (3700) to communicate with an external network (3755); others are commonly integrated into the core of the computer system (3700) by attachment to a system bus as described below (for example Ethernet interface into a PC computer system or cellular network interface into a smartphone computer system). Using any of these networks, computer system (3700) can communicate with other entities. Such communication can be uni-directional, receive only (for example, broadcast TV), uni-directional send-only (for example CANbus to certain CANbus devices), or bi-directional, for example to other computer systems using local or wide area digital networks. Certain protocols and protocol stacks can be used on each of those networks and network interfaces as described above.

Aforementioned human interface devices, human-accessible storage devices, and network interfaces can be attached to a core (3740) of the computer system (3700).

The core (3740) can include one or more Central Processing Units (CPU) (3741), Graphics Processing Units (GPU) 3742, specialized programmable processing units in the form of Field Programmable Gate Areas (FPGA) (3743), hardware accelerators for certain tasks (3744), and so forth. These devices, along with Read-only memory (ROM) (3745), Random-access memory (RAM) (3746), internal mass storage such as internal non-user accessible hard drives, solid-state drives (SSDs), and the like (3747), may be connected through a system bus (3748). In some computer systems, the system bus (3748) can be accessible in the form of one or more physical plugs to enable extensions by additional CPUs, GPU, and the like. The peripheral devices can be attached either directly to the core's system bus (3748), or through a peripheral bus 3749. Architectures for a peripheral bus include peripheral component interconnect (PCI), USB, and the like.

CPUs (3741), GPUs (3742), FPGAs (3743), and accelerators (3744) can execute certain instructions that, in combination, can make up the aforementioned computer code. That computer code can be stored in ROM (3745) or RAM (3746). Transitional data can be also be stored in RAM (3746), whereas permanent data can be stored for example, in the internal mass storage (3747). Fast storage and retrieve to any of the memory devices can be enabled through the use of cache memory, that can be closely associated with one or more CPU (3741), GPU (3742), mass storage (3747), ROM (3745), RAM (3746), and the like.

The computer readable media can have computer code thereon for performing various computer-implemented operations. The media and computer code can be those specially designed and constructed for the purposes of the present disclosure, or they can be of the kind well known and available to those having skill in the computer software arts.

As an example and not by way of limitation, the computer system having architecture (3700), and specifically the core (3740) can provide functionality as a result of processor(s) (including CPUs, GPUs, FPGA, accelerators, and the like) executing software embodied in one or more tangible, computer-readable media. Such computer-readable media can be media associated with user-accessible mass storage as introduced above, as well as certain storage of the core (3740) that are of non-transitory nature, such as core-internal mass storage (3747) or ROM (3745). The software implementing various embodiments of the present disclosure can be stored in such devices and executed by core (3740). A computer-readable medium can include one or more memory devices or chips, according to particular needs. The software can cause the core (3740) and specifically the processors therein (including CPU, GPU, FPGA, and the like) to execute particular processes or particular parts of particular processes described herein, including defining data structures stored in RAM (3746) and modifying such data structures according to the processes defined by the software. In addition or as an alternative, the computer system can provide functionality as a result of logic hardwired or otherwise embodied in a circuit (for example: accelerator 3744), which can operate in place of or together with software to execute particular processes or particular parts of particular processes described herein. Reference to software can encompass logic, and vice versa, where appropriate. Reference to a computer-readable media can encompass a circuit (such as an integrated circuit (IC)) storing software for execution, a circuit embodying logic for execution, or both, where appropriate. The present disclosure encompasses any suitable combination of hardware and software.

While this disclosure has described several exemplary embodiments, there are alterations, permutations, and various substitute equivalents, which fall within the scope of the disclosure. It will thus be appreciated that those skilled in the art will be able to devise numerous systems and methods which, although not explicitly shown or described herein, embody the principles of the disclosure and are thus within the spirit and scope thereof.

What is claimed is:

1. A device for encoding or decoding a video sequence, the device comprising:
   at least one memory configured to store program code;
   at least one processor configured to read the program code and operate as instructed by the program code, the program code including:
   first encoding or decoding code configured to cause the at least one processor to apply a Cross-Component Linear Model (CCLM) to a video sequence and apply an interpolation filter in the Cross-Component Linear Model (CCLM),
   first obtaining code configured to cause the at least one processor to obtain an absolute difference between maximum and minimum values of a plurality of neighboring samples of a first one among a luma block and related to the video sequence;
   dividing code configured to cause the at least one processor to divide the absolute difference into intervals;
   first performing code configured to cause the at least one processor to perform a non-uniform quantization of the absolute difference;
   second obtaining code configured to cause the at least one processor to obtain a floor value based on the absolute difference of which the non-uniform quantization is performed;
   third obtaining code configured to cause the at least one processor to obtain a derived value by using at least the absolute difference and the intervals based on a look-up table; and
   predicting code configured to cause the at least one processor to predict a sample of a different one among a chroma block related to the video sequence, based on the derived value,
   wherein the interpolation filter is dependent upon a YUV format of the video sequence.

2. The device of claim 1, wherein the first encoding or decoding code further comprises code configured to cause the at least one processor to use taps of the interpolation filter applied, in the Cross-Component Linear Model (CCLM), that are dependent upon the YUV format of the video sequence.

3. The device of claim 1, wherein the first encoding or decoding code further comprises code configured to cause the at least one processor to set the format of the interpolation filter, applied in the Cross-Component Linear Model (CCLM), to be the same for the format of the video sequence when the video sequence includes a YUV format of 4:4:4: or 4:2:2, and set the format of the interpolation filter to be different than the format of the video sequence when the video sequence includes a YUV format of 4:2:0.

4. The device of claim 2, wherein the first encoding or decoding code is configured such that the taps of the interpolation filter used in the Cross-Component Linear Model (CCLM) are in the same form as the YUV format of the video sequence.

5. The device of claim 1, wherein the first encoding or decoding code further comprises code configured to cause the at least one processor to use taps of the interpolation filter applied, in the Cross-Component Linear Model (CCLM), that are different for different YUV formats of the video sequence.

6. The device of claim 1, wherein the first encoding or decoding code is configured to apply the Cross-Component Linear Model (CCLM) and apply the interpolation filter in the Cross-Component Linear Model (CCLM) by setting the interpolation filter to be different for top and left neighboring luma reconstructed samples.

7. The device of claim 6, wherein the first encoding or decoding code is configured to apply the Cross-Component Linear Model (CCLM) and apply the interpolation filter in the Cross-Component Linear Model (CCLM) to the top and left neighboring luma reconstructed samples, such that the interpolation filter is dependent on the YUV format of the video sequence.

8. The device of claim 1, wherein the first encoding or decoding code is further configured to cause the at least one processor to set a number of lines in top neighboring luma samples and a number of columns in left neighboring luma samples used in the Cross-Component Linear Model (CCLM) to be dependent on the YUV format of the video sequence.

9. The device of claim 8, wherein the first encoding or decoding code is further configured to cause the at least one processor to use at least one of one row in a top neighboring region and one column in a left neighboring region in the Cross-Component Linear Model (CCLM) for video sequences having one of a YUV format of 4:4:4 or 4:2:2.

10. The device of claim 8, wherein the first encoding or decoding code is further configured to cause the at least one processor to use at least one of one row in a top neighboring region and at least two columns in a left neighboring region in the Cross-Component Linear Model (CCLM) for video sequences having a YUV format of 4:2:2.

11. The device of claim 1, wherein the first obtaining code is further configured to cause the at least one processor to obtain the maximum and minimum values, using N neighboring sample pairs of the luma block and the chroma block, N being a positive integer of one among 4, 8 and 16,
   wherein each of the N neighboring sample pairs comprises a first neighboring sample at a first location neighboring the first one among the luma block and the chroma block, and a second neighboring sample at a second location neighboring the second one among the luma block and the chroma block and corresponding to the first location neighboring the first one among the luma block and the chroma block.

12. The device of claim 11, wherein the first obtaining code is further configured to cause the at least one processor to select the first neighboring sample by scanning the plurality of neighboring samples from bottom to top and/or from right to left.

13. The device of claim 1, wherein the program code further comprises:
   fourth obtaining code configured to cause the at least one processor to obtain a scaling factor and an offset of a linear model for local illumination compensation (LIC) of a current block, using N neighboring sample pairs of the current block and a reference block, N being a positive integer of one among 4, 8 and 16,
   wherein each of the N neighboring sample pairs comprises a first neighboring sample at a first location neighboring the current block, and a second neighboring sample at a second location neighboring the reference block and corresponding to the first location neighboring the current block; and
   second performing code configured to cause the at least one processor to perform the local illumination compensation (LIC) of the current block, using the obtained scaling factor and the obtained offset.

14. The device of claim 13, wherein N is dependent on a block size of the current block.

15. A non-transitory computer-readable medium storing program code, the program code comprising one or more instructions that, when executed by one or more processors of a device, cause the one or more processors to:
   apply a Cross-Component Linear Model (CCLM) to a video sequence and apply an interpolation filter in the Cross-Component Linear Model (CCLM),
   obtain an absolute difference between maximum and minimum values of a plurality of neighboring samples of a first one among a luma block and related to the video sequence;
   divide the obtained absolute difference into intervals;
   perform a non-uniform quantization of the obtained absolute difference;
   obtain a floor value based on the absolute difference of which the non-uniform quantization is performed;
   obtain a derived value by using at least the absolute difference and the intervals based on a look-up table; and
   predict a sample of a different one among a chroma block related to the video sequence, based on the derived value,
   wherein the interpolation filter is dependent upon a YUV format of the video sequence.

16. The non-transitory computer-readable medium storing program code of claim 15, wherein in the applying of the interpolation filter in the Cross-Component Linear Model (CCLM), the program code further comprises one or more instructions that, when executed by the one or more processors, causes the one or more processors to use taps of the interpolation filter that are dependent upon the YUV format of the video sequence.

17. The non-transitory computer-readable medium storing program code of claim 15, wherein in the application of the Cross-Component Linear Model (CCLM) taps of the interpolation filter are used in the Cross-Component Linear Model (CCLM) that are in the same form as the YUV format of the video sequence.

18. The non-transitory computer-readable medium storing program code of claim 15, wherein in the application of the Cross-Component Linear Model (CCLM) the format of the interpolation filter is set to be the same for the format of the video sequence when the video sequence includes a YUV format of 4:4:4: or 4:2:2, and the format of the interpolation filter is set to be different than the format of the video sequence when the video sequence includes a YUV format of 4:2:0.

19. The non-transitory computer-readable medium storing program code of claim 15, wherein in the application of the Cross-Component Linear Model (CCLM) taps of the interpolation filter are used, which are different for different YUV formats of the video sequence.

20. The non-transitory computer-readable medium storing program code of claim 15, wherein in the application of the Cross-Component Linear Model (CCLM) the interpolation filter is set to be different for top and left neighboring luma reconstructed samples.

* * * * *